US012122600B2

(12) United States Patent
Ueda et al.

(10) Patent No.: US 12,122,600 B2
(45) Date of Patent: Oct. 22, 2024

(54) ARTICLE STORAGE FACILITY

(71) Applicant: Daifuku Co., Ltd., Osaka (JP)

(72) Inventors: Yuichi Ueda, Hinocho (JP); Masashige Iwata, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 342 days.

(21) Appl. No.: 17/796,390

(22) PCT Filed: Jan. 15, 2021

(86) PCT No.: PCT/JP2021/001237
§ 371 (c)(1),
(2) Date: Jul. 29, 2022

(87) PCT Pub. No.: WO2021/153270
PCT Pub. Date: Aug. 5, 2021

(65) Prior Publication Data
US 2023/0047293 A1 Feb. 16, 2023

(30) Foreign Application Priority Data
Jan. 31, 2020 (JP) .................. 2020-014501

(51) Int. Cl.
*B65G 1/04* (2006.01)
*B65G 1/137* (2006.01)
(52) U.S. Cl.
CPC .......... *B65G 1/0435* (2013.01); *B65G 1/1375* (2013.01)
(58) Field of Classification Search
CPC .................................. B65G 1/0435

USPC ......................................... 414/280
See application file for complete search history.

(56) References Cited

U.S. PATENT DOCUMENTS

| 9,598,236 | B2 * | 3/2017 | Nakamura | B65G 1/0421 |
| 9,994,394 | B2 * | 6/2018 | Masuda | B65G 1/0421 |
| 10,479,605 | B2 * | 11/2019 | Ueda | B65G 1/1376 |
| 2006/0245862 | A1 * | 11/2006 | Hansl | B65G 1/0435 |
| | | | | 414/281 |
| 2018/0134488 | A1 | 5/2018 | Grosse et al. | |

FOREIGN PATENT DOCUMENTS

| EP | 3418222 A1 | 12/2018 |
| JP | 5541178 B2 | 5/2014 |
| WO | 2016168874 A1 | 10/2016 |

* cited by examiner

*Primary Examiner* — James Keenan
(74) *Attorney, Agent, or Firm* — The Webb Law Firm

(57) ABSTRACT

A control unit causes a transfer machine to execute a first article take-out operation by moving a locking part to a depth-direction near side with the locking part locked to a rear surface portion of a first article; and a second article position adjustment operation of moving the locking part disposed between the first article and a second article in the depth direction toward a far side to a position corresponding to a front surface portion of the second article located at a second article proper position, and the control unit is configured to, after the locking part has been disposed between the first article and the second article during execution of the first article take-out operation using the transfer machine, cause the transfer machine to execute the second article position adjustment operation, and to complete the first article take-out operation upon completion of the second article position adjustment operation.

8 Claims, 10 Drawing Sheets

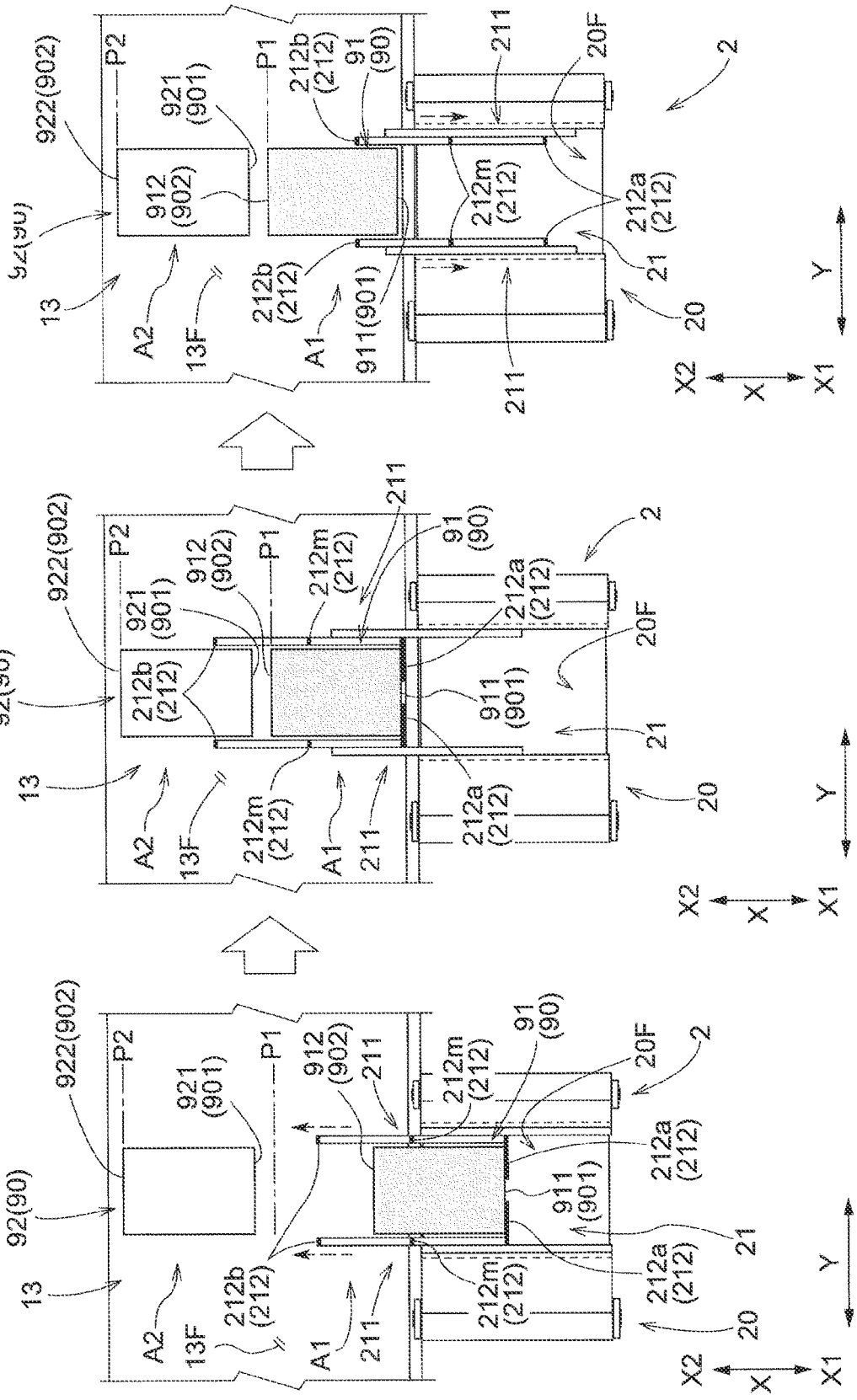

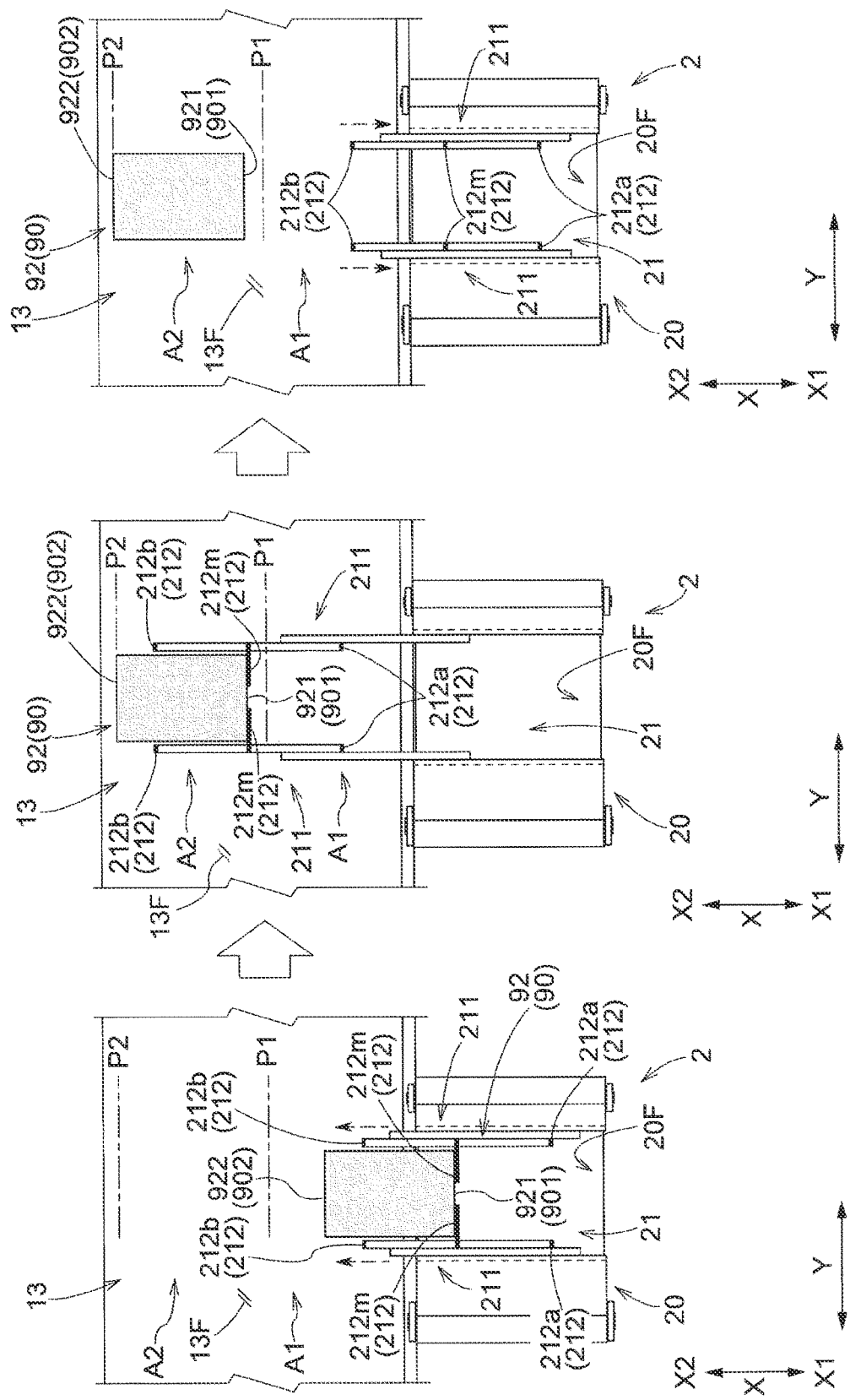

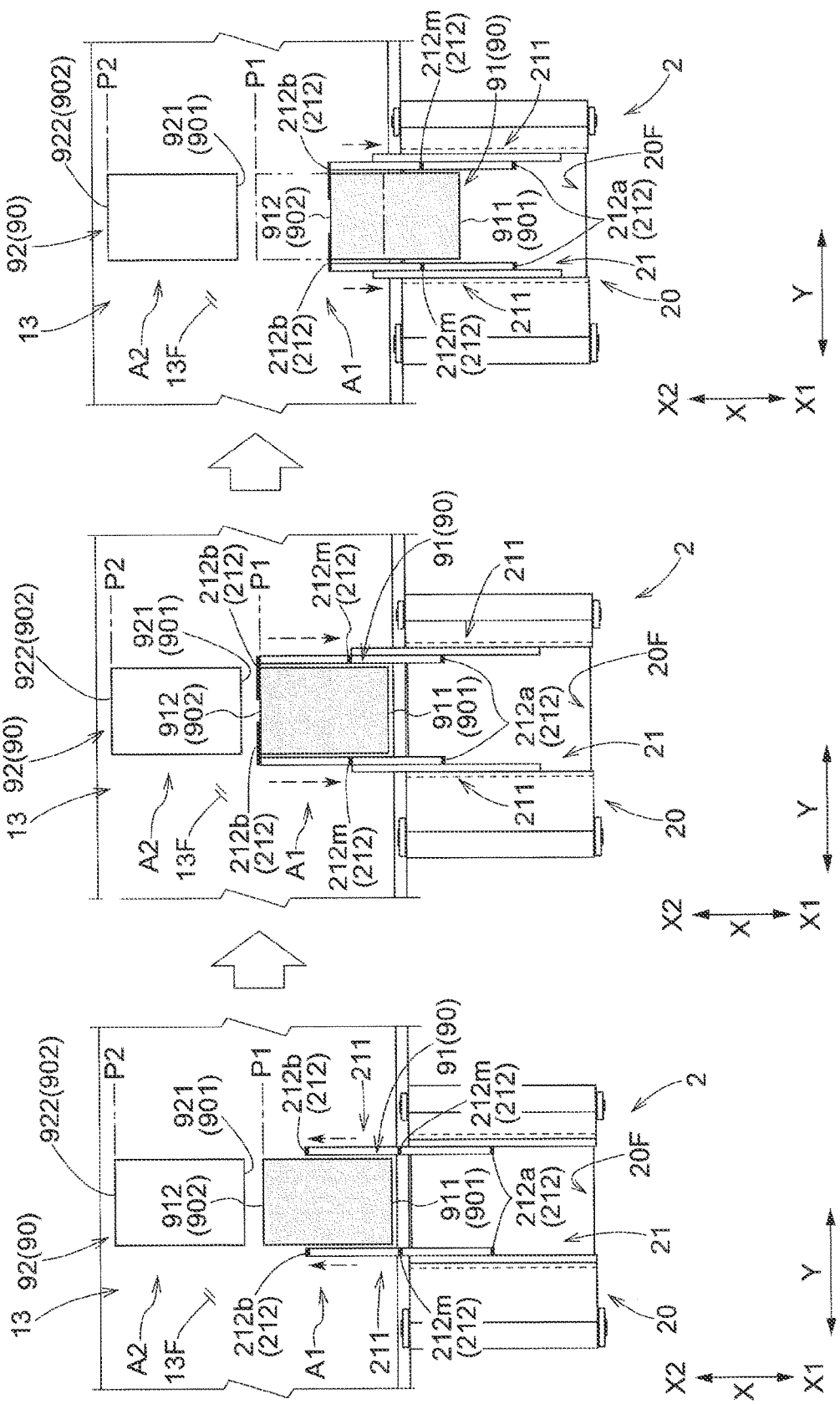

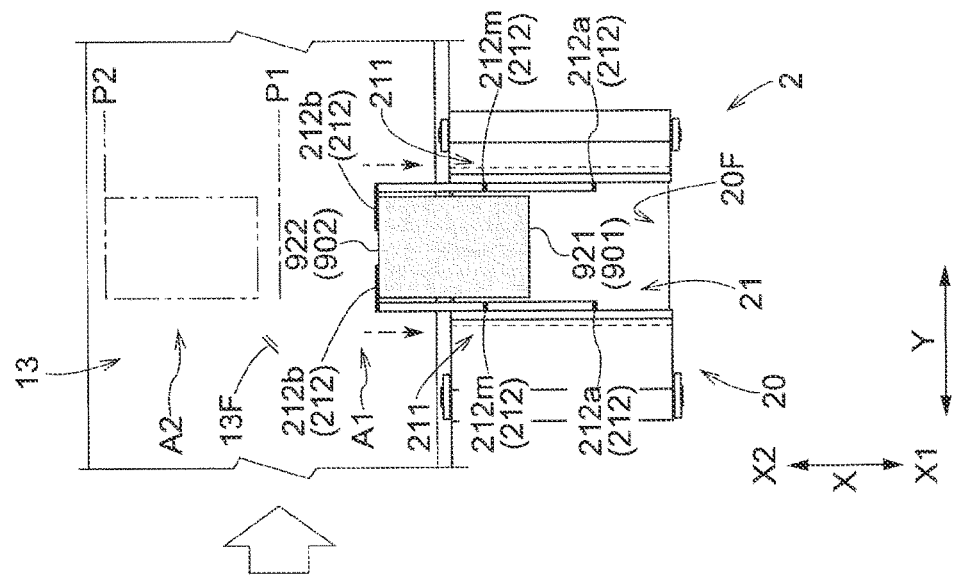
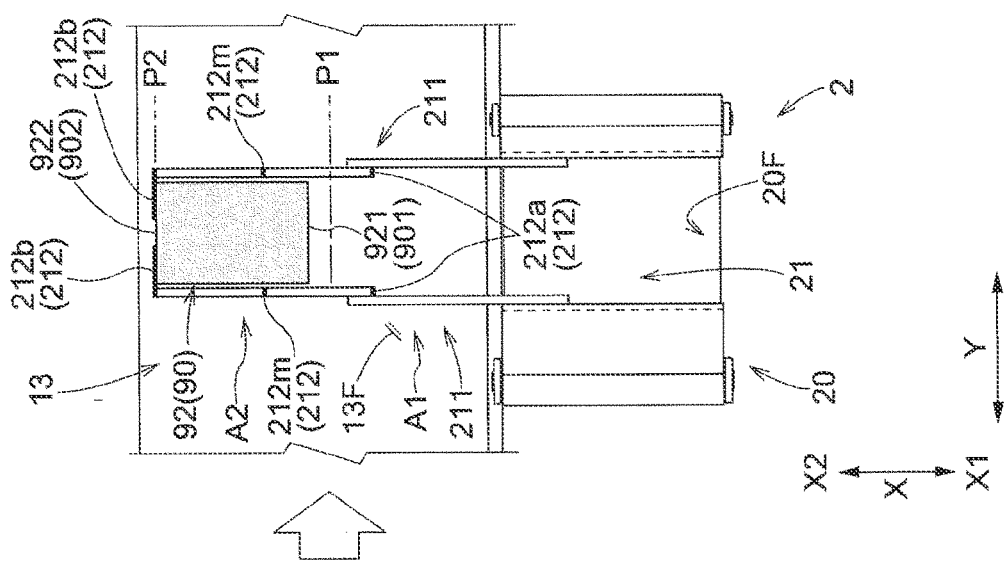
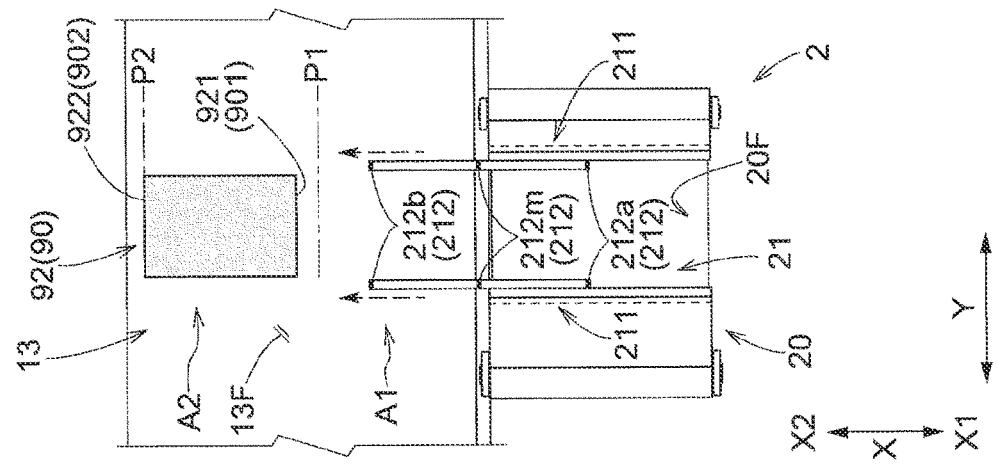

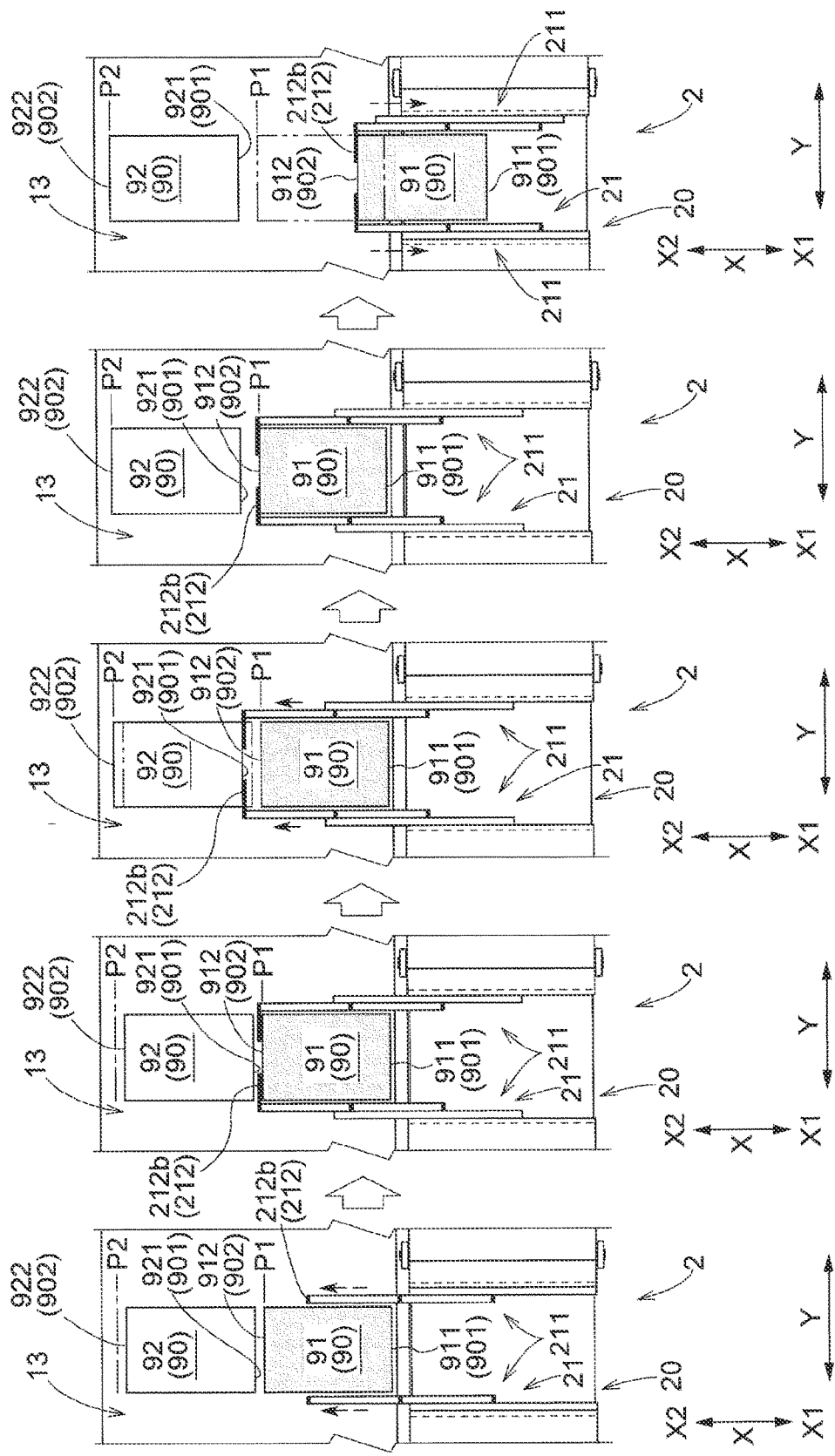

ARTICLE STORAGE FACILITY

CROSS-REFERENCE TO RELATED APPLICATIONS

This application is the United States national phase of International Application No. PCT/JP2021/001237 filed Jan. 15, 2021, and claims priority to Japanese Patent Application No. 2020-014501 filed Jan. 31, 2020, the disclosures of which are hereby incorporated by reference in their entirety.

BACKGROUND OF THE INVENTION

Field of the Invention

The present invention relates to an article storage facility including an article storage rack including a storage section capable of storing articles, and a transport device that transports the articles.

Description of Related Art

An example of such an article storage facility is disclosed in Japanese Patent No. 5541178 (Patent Document 1). In the following, the reference numerals shown in parentheses in the description of the background art are those of Patent Document 1.

The article storage facility described in Patent Document 1 includes a storage section (11) capable of storing two articles (W) arranged in a depth direction (X), and a transport device (3) that transports the articles (W) in a transport direction (Y) intersecting the depth direction (X). The transport device (3) includes a transfer machine (29) that moves the articles (W) in the depth direction (X), and the transfer machine (29) transfers the articles (W) to the storage section (11).

Patent Document 1: Japanese Patent No. 5541178

Meanwhile, in the article storage facility described in Patent Document 1, an article (W) stored in the storage section (11) may become displaced due to vibrations caused by the operation or the like of the transport device (3). The position of the displaced article (W) can be adjusted using the transfer machine (29) included in the transport device (3).

Here, when adjusting the position of the article (W) disposed on a side (far side) distant from the transport device (3) in the depth direction (X), of two articles (W) stored in the storage section (11), the article (W) disposed on a side (near side) close to the transport device (3) in the depth direction (X) acts as an impediment, thus making it difficult to detect the position of the article (W) on the far side from the transport device (3) side. Accordingly, it is difficult to appropriately adjust the position of the article (W) on the far side. On the other hand, in order to appropriately detect the position of the article (W) on the far side from the transport device (3) side, the article (W) on the near side needs to be temporarily transported to another location. If the storage and retrieval operation of the articles (W) to and from the storage section (11) is impeded by such transferring, the overall storage and retrieval capability of the facility will be reduced. Preferential execution of the storage and retrieval operation of the facility to avoid this situation may lead to fewer opportunities to adjust the positions of the articles (W). Thus, the position adjustment cannot be executed at an appropriate timing, resulting in a possible increase in the displacement of articles (W) stored in the storage section (11). As such, according to conventional techniques, appropriate position adjustment for the article on the far side requires, for example, execution of another operation such as transporting the article (W) on the near side, which does not directly contribute to position adjustment, or suspension of the storage and retrieval operation of another article (W), and thus it is not possible to efficiently adjust the position of the article on the far side.

SUMMARY OF THE INVENTION

In view of the above-described circumstances, it is desirable to realize an article storage facility that enables, in a configuration including a storage section capable of storing two articles arranged in a depth direction, efficient adjustment of the position of the article disposed on the far side in the depth direction.

An article storage facility according to the present disclosure includes:

an article storage rack including a storage section capable of storing two articles arranged in a depth direction;

a transport device configured to transport the articles in a transport direction intersecting the depth direction; and a control unit configured to control actuation of the transport device, wherein the transport device includes a transfer machine configured to execute a take-out operation of moving the articles in the depth direction to take out the articles from the article storage rack, when a side on which the transport device is located relative to the article storage rack in the depth direction is defined as a depth-direction near side, a side opposite to the depth-direction near side is defined as a depth-direction far side, the article stored on the depth-direction near side of the storage section is defined as a first article, the article stored on the depth-direction far side of the storage section is defined as a second article, and a proper position of the second article in the storage section is defined as a second article proper position, the transfer machine includes a locking part configured to be locked to either a front surface portion of each of the articles that faces the depth-direction near side or a rear surface portion of each of the articles that faces the depth-direction far side, and a driver configured to move the locking part, the control unit is capable of controlling the driver to cause the transfer machine to execute:

a first article take-out operation of disposing the locking part between the first article and the second article in the depth direction, and subsequently moving the locking part to the depth-direction near side with the locking part locked to the rear surface portion of the first article, to execute the take-out operation on the first article; and a second article position adjustment operation of moving the locking part disposed between the first article and the second article in the depth direction toward the depth-direction far side to a position corresponding to a position of the front surface portion of the second article located at the second article proper position, and the control unit is configured to, after the locking part has been disposed between the first article and the second article during execution of the first article take-out operation using the transfer machine, cause the transfer machine to execute the second article position adjustment operation, and to complete the first article take-out operation upon completion of the second article position adjustment operation.

With the present configuration, the transfer machine executes the second article position adjustment operation to move the locking part toward the depth-direction far side to a position corresponding to a position of the front surface portion of the second article located at the second article proper position. Thus, even if the second article has shifted from the second article proper position toward the depth-direction near side before execution of the second article position adjustment operation, the second article can be moved to the depth-direction far side to be positioned at the second article proper position using the locking part. Also, with the present configuration, such a second article position adjustment operation is executed after the locking part has been disposed between the first article and the second article during execution of the first article take-out operation. Accordingly, the position of a second article that is stored on the depth-direction far side relative to a first article to be taken out can be adjusted using an operation of moving the locking part in order to take out the first article. Therefore, with the present configuration, it is possible to efficiently adjust the position of the second article stored on the depth-direction far side of the storage section.

Further features and advantages of the technique according to the present disclosure will become apparent from the following description of illustrative and non-limiting embodiments with reference to the drawings.

BRIEF DESCRIPTION OF THE DRAWINGS

FIGS. 7(a)-(c) are diagrams illustrating a first article delivery operation.

FIGS. 8(a)-(c) are diagrams illustrating a second article delivery operation.

FIGS. 9(a)-(c) are diagrams illustrating a first article take-out operation.

FIGS. 10(a)-(c) are diagrams illustrating a second article take-out operation.

FIGS. 11(a)-(e) are diagrams illustrating a second article position adjustment operation executed during the first article take-out operation.

DESCRIPTION OF THE INVENTION

Figure 1:
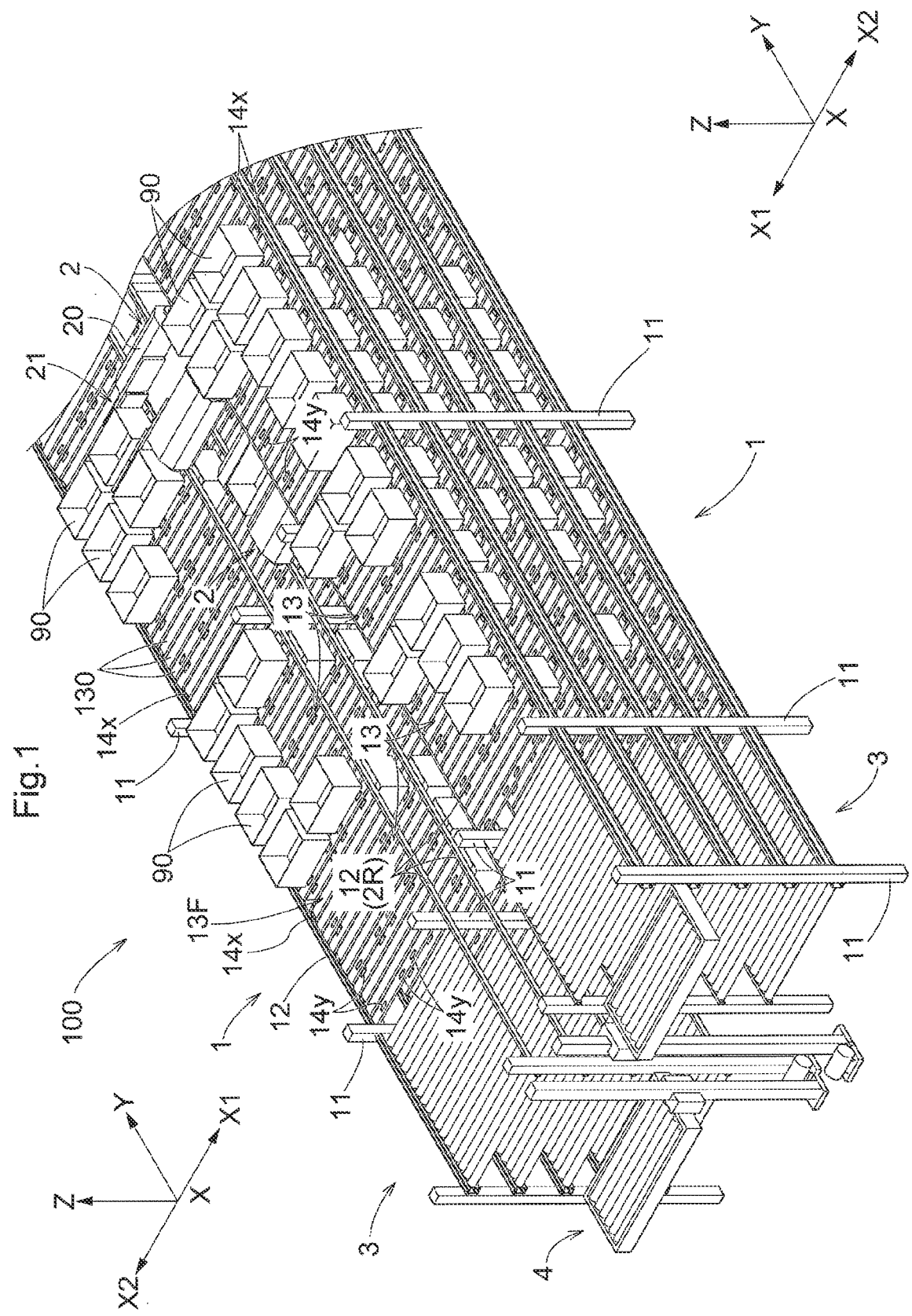
FIG. 1 is a schematic perspective view of an article storage facility.

An article storage facility according to an embodiment will be described below with reference to the drawings.
Schematic Configuration of Article Storage Facility As shown in FIG. 1, an article storage facility 100 includes at least one article storage rack 1 including at least one storage section 13 capable of storing two articles 90 arranged in a depth direction X, at least one transport device 2 that transports the articles 90 in a transport direction intersecting the depth direction X, and a control unit C2 (see FIG. 6) that controls actuation of the transport device 2. In the present embodiment, a pair of article storage racks 1 are disposed on opposite sides in the depth direction X with the transport device 2 therebetween.

The transport device 2 includes a transfer machine 21 that executes a take-out operation of moving the articles 90 in the depth direction X to take out the articles 90 from an article storage rack 1 (storage section 13). In the present embodiment, the transfer machine 21 is configured to execute, in addition to such a take-out operation, a delivery operation of delivering the articles 90 to each article storage rack 1 (storage section 13). That is, the transfer machine 21 is configured to execute a transfer operation of transferring the articles 90 to a storage section 13 of an article storage rack 1, and the transfer operation includes the take-out operation and the delivery operation described above.

Here, the "depth direction X" is a direction in which the transport device 2 places the articles 90 into, or takes the articles 90 out of each article storage rack 1 (storage section 13). That is, the depth direction X coincides with the direction in which the articles 90 are transferred to/from the storage section 13 by the transfer machine 21. In the following, a side in the depth direction X on which the transport device 2 is located relative to the article storage rack 1 is referred to as a depth-direction near side X1, and a side opposite thereto is referred to as a depth-direction far side X2. A direction that is orthogonal to the depth direction X in a plan view is referred to as a "width direction Y". The width direction Y coincides with the direction in which the articles 90 are transported by the transport device 2. In the present example, the width direction Y also coincides with a direction in which a front plane (virtual plane in which an opening for transferring the articles 90 is provided) of each article storage rack 1 horizontally extends. The two article storage racks 1 have the same structure. Unless otherwise stated, the following description regarding the article storage rack 1 is given for one of the two article storage racks 1.

In the present embodiment, the article storage rack 1 includes at least one storage section 13 in which the articles 90 are stored, a plurality of struts 11 disposed at predetermined intervals in the depth direction X and the width direction Y, and a beam 12 provided between each pair of struts 11 that are adjacent to each other in the width direction Y.

Figure 2:
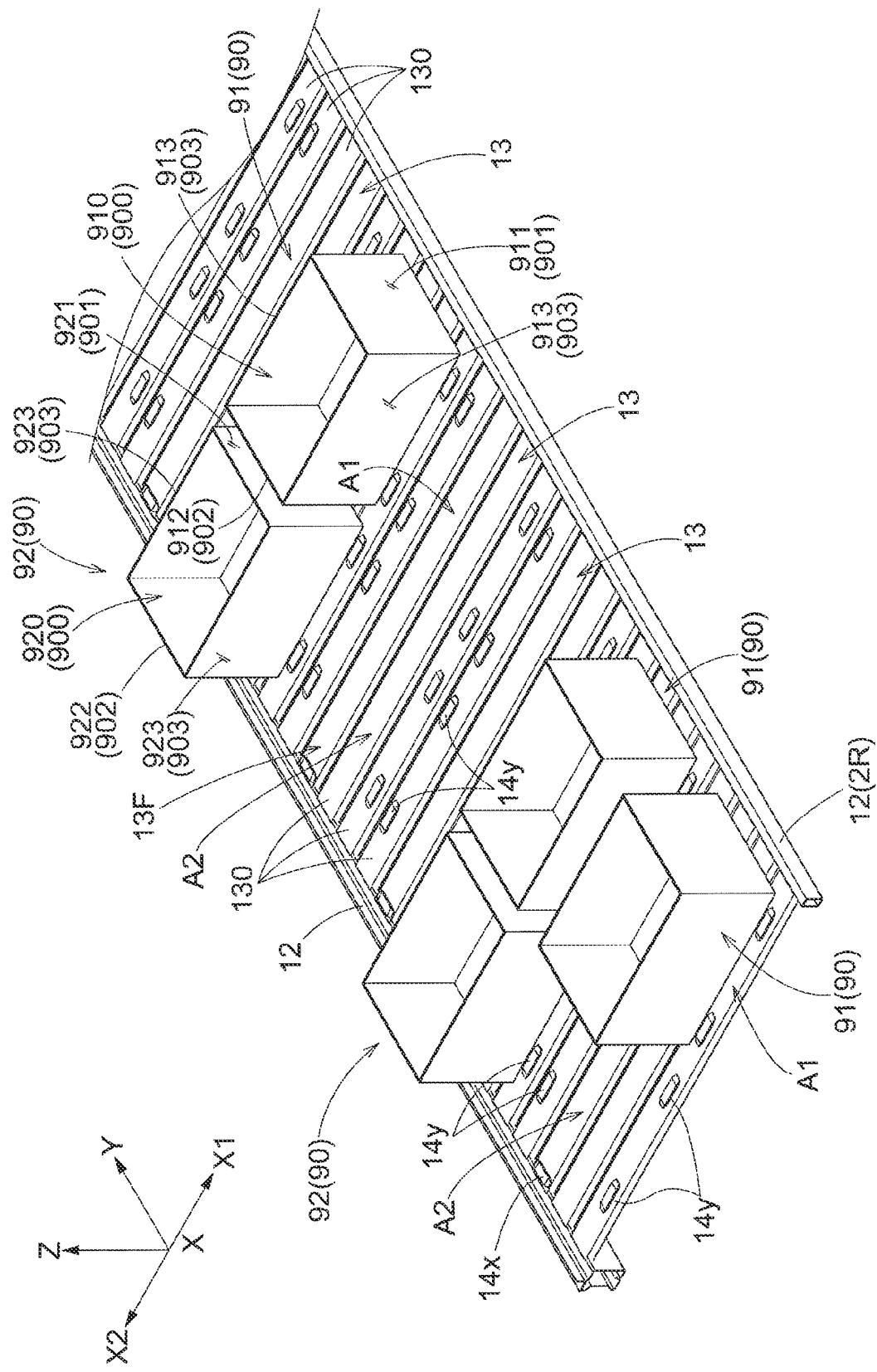
FIG. 2 is a perspective view showing relevant parts of an article storage rack.

As shown in FIG. 2, in the present embodiment, the surface of each storage section 13 on which the articles 90 are placed is referred to as a placement surface 13F. Each storage section 13 includes at least one shelf plate member 130 on which the placement surface 13F is formed. The shelf plate member 130 is a plate-shaped member that is bent at a plurality of positions. Also, the placement surface 13F is formed on an upper surface of the shelf plate member 130. In the present embodiment, one storage section 13 is formed by a plurality of shelf plate members 130 arranged in the width direction Y. In the present example, one storage section 13 is formed by four shelf plate members 130 arranged in the width direction Y.

In the present embodiment, a plurality of storage sections 13 are arranged in the width direction Y between each pair of struts 11 that are adjacent to each other in the width direction Y. One storage section 13 is configured to store two articles 90 arranged in the depth direction X. That is, each storage section 13 has a placement surface 13F having a length in the depth direction X that is larger than the total length of the two articles 90 in the depth direction X, and a length in the width direction Y that is larger than the length in the width direction Y of one article 90. In the present embodiment, a plurality of sets of storage sections 13 arranged in the width direction Y are provided in a plurality of rows in the vertical direction Z. Additionally, in the present embodiment, a plurality of rows of transport devices 2 are provided in one-to-one correspondence with the plurality of rows of storage sections 13.

As shown in FIG. 1, the article storage facility 100 includes at least one lifter 4 capable of moving up and down in the vertical direction Z to transport the articles 90 to a height corresponding to each of the plurality of rows of storage sections 13. For example, the lifter 4 includes a mast extending in the vertical direction Z, and an article placement table that is driven by a motor to move up and down along the mast.

A relay conveyor 3 that transports the articles 90 between the lifter 4 and the article storage rack 1 is provided between the lifter 4 and the article storage rack 1 in the width direction Y. A plurality of rows of relay conveyors 3 are provided in one-to-one correspondence with the plurality of rows of storage sections 13, and transport the articles 90 in the width direction Y with the articles 90 placed thereon. For example, each relay conveyor 3 is constituted by a roller conveyor, a belt conveyor, or the like. In the illustrated examples, a pair of sets of an article storage rack 1, a relay conveyor 3, and a lifter 4 arranged in the width direction Y are provided in the depth direction X with transport devices 2 therebetween. However, the present disclosure is not limited to such a configuration, and a set of an article storage rack 1, a relay conveyor 3, and a lifter 4 may be provided on only one side in the depth direction X relative to a transport path of each transport device 2.

In the article storage facility 100 according to the present embodiment, storage and retrieval of the articles 90 are executed using the lifter 4, the relay conveyor 3, and the transport device 2. However, transport devices such as the lifter 4 and the relay conveyor 3 are not essential components of the article storage facility 100. Conversely, storage and retrieval of the articles 90 may be executed using another transport device (or a person) in addition to the lifter 4 and the relay conveyor 3.

Articles

Here, a description will be given of an article 90 that is an object to be transported by the transport device 2 (an object to be transferred by the transfer machine 21), and that is also an object to be stored by the storage section 13. In the following description of the article 90, when any "direction" or any "side" is defined, they are defined with reference to a state in which the article 90 is stored in the storage section 13.

In the present embodiment, the article 90 is a case that houses a product or the like. More specifically, the article 90 is a resin case (e.g., a container or a so-called collapsible container that can be folded).

As shown in FIG. 2, in the present embodiment, each article 90 includes a main body portion 900, and a bottom portion 904 (see FIG. 4) protruding downward from the main body portion 900. In the present embodiment, the main body portion 900 is a portion that houses a product or the like, and has a box shape. Also, the main body portion 900 has, while an article 90 is stored in the storage section 13, a front surface portion 901 formed on a front surface that faces the depth-direction near side X1, a rear surface portion 902 formed on a rear surface that faces the depth-direction far side X2, and side surface portions 903 respectively formed on opposite sides facing the width direction Y. The pair of side surface portions 903 face opposite sides in the width direction Y. The front surface portion 901 and the rear surface portion 902 have the same structure, and both can be the front surface portion 901 or the rear surface portion 902, depending on the state in which the article 90 is housed.

Figure 4:
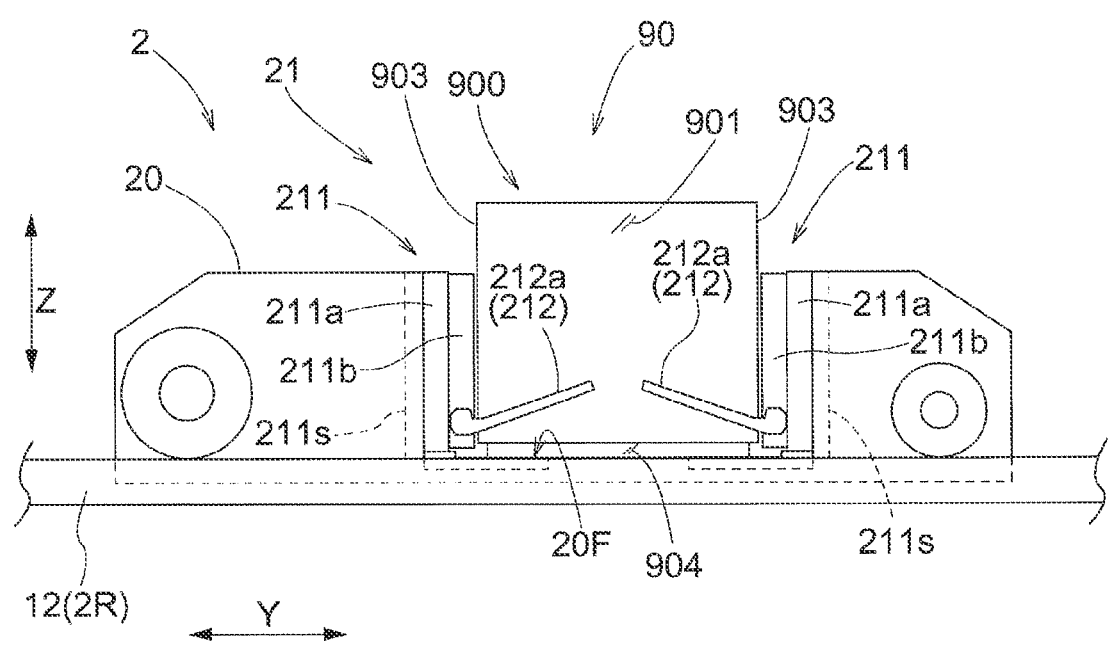
FIG. 4 is a diagram showing relevant parts of the transport device as viewed in a depth direction.

The bottom portion 904 is a portion that is placed on the placement surface 13F of the storage section 13 while the article 90 is stored in the storage section 13. As shown in FIG. 4, the bottom portion 904 is supported from below by the transport device 2 (more specifically, a support surface 20F of a travel carriage 20) when the article 90 is transported by the transport device 2. In the present example, the article 90 is transferred between the transport device 2 and the storage section 13 as a result of the bottom portion 904 sliding over the support surface 20F of the travel carriage 20 and the placement surface 13F of the storage section 13. In the present embodiment, the bottom portion 904 is smaller than the main body portion 900 in a plan view.

As described above, each storage section 13 that stores articles 90 is configured to store two articles 90 arranged in the depth direction X. Here, an article 90 that is stored on the depth-direction near side X1 of the storage section 13 is referred to as a first article 91, and an article 90 that is stored on the depth-direction far side X2 of the storage section 13 is referred to as a second article 92. In the present embodiment, a first placement region A1 in which the first article 91 is placed is set in the storage section 13, and a second placement region A2 in which the second article 92 is placed is set in the storage section 13 further toward the depth-direction far side X2 than the first placement region A1.

In the following, an article 90 being placed in the first placement region A1, or an article 90 to be placed in the first placement region A1 is defined as a first article 91. An article 90 being placed in the second placement region A2, or an article 90 to be placed in the second placement region A2 is defined as a second article 92. That is, an article 90 being transferred to the first placement region A1 is also defined as a first article 91 here. Similar also applies to the second article 92. The main body portion, the front surface portion, the rear surface portion, and the side surface portions of the first article 91 are respectively denoted by 910, 911, 912, and 913 in the drawings. Similarly, the main body portion, the front surface portion, the rear surface portion, and the side surface portions of the second article 92 are respectively denoted by 920, 921, 922, and 923 in the drawings. When there is no need to distinguish between the first article 91 and the second article 92, these articles are simply referred to as an article 90.

Configuration of Article Storage Rack

As shown in FIGS. 1 and 2, each article storage rack 1 includes at least one storage section 13 that has a placement surface 13F on which the articles 90 are placed, and that stores the articles 90 that are transferred in such a manner as to slide on the placement surface 13F in the depth direction X.

Each storage section 13 is configured to store two articles 90 arranged in the depth direction X. As described above, in the present embodiment, the storage section 13 includes a plurality of shelf plate members 130 arranged in the width direction Y. The placement surface 13F of the storage section 13 is formed by the respective upper surfaces of the plurality of shelf plate members 130 of the storage section 13.

In the present embodiment, as shown in FIGS. 7(a)-(c) and 9(a)-(c), a proper position of the first article 91 in the storage section 13 is defined as a first article proper position P1, and a region of the placement surface 13F in which the first article 91 at the first article proper position P1 is placed is defined as a first placement region A1. The first placement region A1 is a region that is set in a part of the placement surface 13F.

In the present embodiment, as shown in FIGS. 8(a)-(c) and 10(a)-(c), a proper position of the second article 92 in the storage section 13 is defined as a second article proper position P2, and a region of the placement surface 13F in which the second article 92 at the second article proper position P2 is placed is defined as a second placement region A2. The second placement region A2 is a region that is set in a part of the placement surface 13F.

As shown in FIG. 2, in the present embodiment, width direction restricting members 14y protruding upward from the placement surface 13F are provided on opposite sides in the width direction Y relative to each of the first placement region A1 and the second placement region A2. Accordingly, it is possible to restrict the position in the width direction Y of an article 90 stored in the storage section 13.

In the present embodiment, while an article 90 is stored in a storage section 13, the width direction restricting members 14y are disposed on opposite sides in the width direction Y relative to the article 90. In the present example, the width direction restricting members 14y are disposed on opposite sides in the width direction Y relative to the first placement region A1. In the illustrated example, a pair of width direction restricting members 14y are disposed spaced apart in the depth direction X on each of the opposite sides in the width direction Y relative to the first placement region A1. That is, four width direction restricting members 14y are disposed for one first placement region A1. Accordingly, it is possible to restrict rotation of the first article 91 about an axis that is orthogonal to the placement surface 13F, and thus the orientation of the first article 91 can be easily restricted to a proper orientation. In other words, the orientation of the first article 91 can be restricted such that the side surface portions 913 of the first article 91 extend in the depth direction X, and the front surface portion 911 and the rear surface portion 912 of the first article 91 extend in the width direction Y. Accordingly, it is possible to realize a configuration that facilitates the transfer of the first article 91 in an appropriate orientation. In the present example, in order to enhance such a restricting function, each of the width direction restricting members 14y is disposed at a position that is outside the first placement region A1 and that is adjacent to a boundary in the width direction Y of the first placement region A1. The width direction restricting members 14y are also disposed for the second placement region A2 in the same manner as in the case of the first placement region A1. That is, in the present example, four width direction restricting members 14y are disposed for one second placement region A2. Accordingly, it is possible to realize a configuration that facilitates the transfer of the second article 92 in an appropriate orientation.

In the present embodiment, a depth direction restricting member 14x protruding upward from the placement surface 13F is provided on the depth-direction far side X2 relative to the second placement region A2. Accordingly, it is possible to restrict the movement of the second article 92 stored in the storage section 13 further toward the depth-direction far side X2 past the depth direction restricting member 14x.

In the present embodiment, the depth direction restricting member 14x is disposed on the depth-direction far side X2 relative to the second article 92 that is placed on the second placement region A2. In the present example, the depth direction restricting member 14x is disposed on the depth-direction far side X2 relative to the second placement region A2. More particularly, the depth direction restricting member 14x is disposed at a position that is outside the second placement region A2, and that is adjacent to a boundary in the depth-direction far side X2 of the second placement region A2. In the present example, one depth direction restricting member 14x is disposed on the depth-direction far side X2 relative to the second placement region A2. However, the present disclosure is not limited thereto, and a plurality of depth direction restricting members 14x may be disposed on the depth-direction far side X2 relative to the second placement region A2.

In the present embodiment, the width direction restricting members 14y and the depth direction restricting member 14x are each formed by a member separate from the corresponding shelf plate member 130, and arranged in the storage section 13 by being attached to the shelf plate member 130. However, the present disclosure is not limited thereto, and at least either the width direction restricting members 14y or the depth direction restricting member 14x may be formed in one piece with the corresponding shelf plate member 130.

Here, the above-described first article proper position P1 (see FIGS. 7(a)-(c), etc.) is a proper position of the first article 91 in the storage section 13. In the present embodiment, the first article proper position P1, in the width direction Y, is a position of the first article 91 stored in the storage section 13 while a position thereof in the width direction Y is restricted by the width direction restricting members 14y, and the first article proper position P is defined with reference to the position in the width direction Y of the side surface portions 913 of the first article 91. The first article proper position P1, in the depth direction X, is a position of the first article 91 stored in the storage section 13 such that the front surface portion 911 of the first article 91 is located at a position away from an end portion on the depth-direction near side X1 of the storage section 13 toward the depth-direction far side X2 by a predetermined distance, and is defined with reference to the position in the depth direction X of the front surface portion 911 or the rear surface portion 912 of the first article 91. In the present example, as shown in FIGS. 7(a)-(c) and so forth, the first article proper position P1 in the depth direction X is defined with reference to the rear surface portion 912 of the first article 91. That is, with the rear surface portion 912 of the first article 91 located at the first article proper position P1 indicated by the dashed dotted line in the drawings, the first article 91 is located at the first article proper position P1 in the depth direction X.

The above-described second article proper position P2 (see FIGS. 7(a)-(c), etc.) is a proper position of the second article 92 in the storage section 13. In the present embodiment, the second article proper position P2, in the width direction Y, is a position of the second article 92 stored in the storage section 13 while a position thereof in the width direction Y is restricted by the width direction restricting members 14y, and the second article proper position P2 is defined with reference to the position in the width direction Y of the side surface portions 923 of the second article 92. The second article proper position P2, in the depth direction X, is a position of the second article 92 stored in the storage section 13 such that the rear surface portion 922 of the second article 92 is located at a position away from an end portion on the depth-direction far side X2 of the storage section 13 toward the depth-direction near side X1 by a predetermined distance, and is defined with reference to the position in the depth direction X of the front surface portion 921 or the rear surface portion 922 of the second article 92. In the present example, as shown in FIGS. 7(a)-(c) and so forth, the second article proper position P2 in the depth direction X is defined with reference to the rear surface portion 922 of the second article 92. That is, with the rear surface portion 922 of the second article 92 located at the second article proper position P2 indicated by the dashed dotted line in the drawings, the second article 92 is located at the second article proper position P2 in the depth direction X. Although not shown in detail in FIGS. 7(*a*)-(*c*) and so forth, in the present example, the rear surface portion 922 of the second article 92 located at the second article proper position P2 is disposed further toward the depth-direction near side X1 than the depth direction restricting member 14*x* (see FIG. 2).

Configuration of Transport Device

As shown in FIG. 1, each transport device 2 transports articles 90 in the width direction Y. The transport device 2 moves an article 90 in the depth direction X to transfer the article 90 to a storage section 13.

In the present embodiment, each transport device 2 includes travel rails 2R disposed in the width direction Y, and a travel carriage 20 that is supported by the travel rails 2R and that travels along the travel rails 2R. Each of the travel rails 2R is provided on the depth-direction near side X1 relative to the storage sections 13 arranged in the width direction Y. In the present embodiment, each of the travel rails 2R is provided in one piece with the beams 12 located on the depth-direction near side X1 of the corresponding article storage rack 1. The travel carriage 20 includes a support surface 20F (see FIGS. 3 and 4) capable of supporting an article 90 from below. The transport device 2 is configured to transport an article 90 in the width direction Y using the travel carriage 20 traveling on the travel rails 2R with the article 90 supported by the support surface 20F.

Each transport device 2 includes a transfer machine 21 configured to execute a transfer operation of transferring an article 90 to/from each storage section 13 of the article storage rack 1. The transfer machine 21 is configured to transfer an article 90 to/from the storage section 13 by moving the article 90 in the depth direction X. More specifically, as shown in FIGS. 7(*a*)-(*c*) and so forth, the transport device 2 is configured to transfer an article 90 to/from each storage section 13 by causing the article 90 to slide in the depth direction X on the support surface 20F of the travel carriage 20 and the placement surface 13F of a storage section 13.

Figure 3:
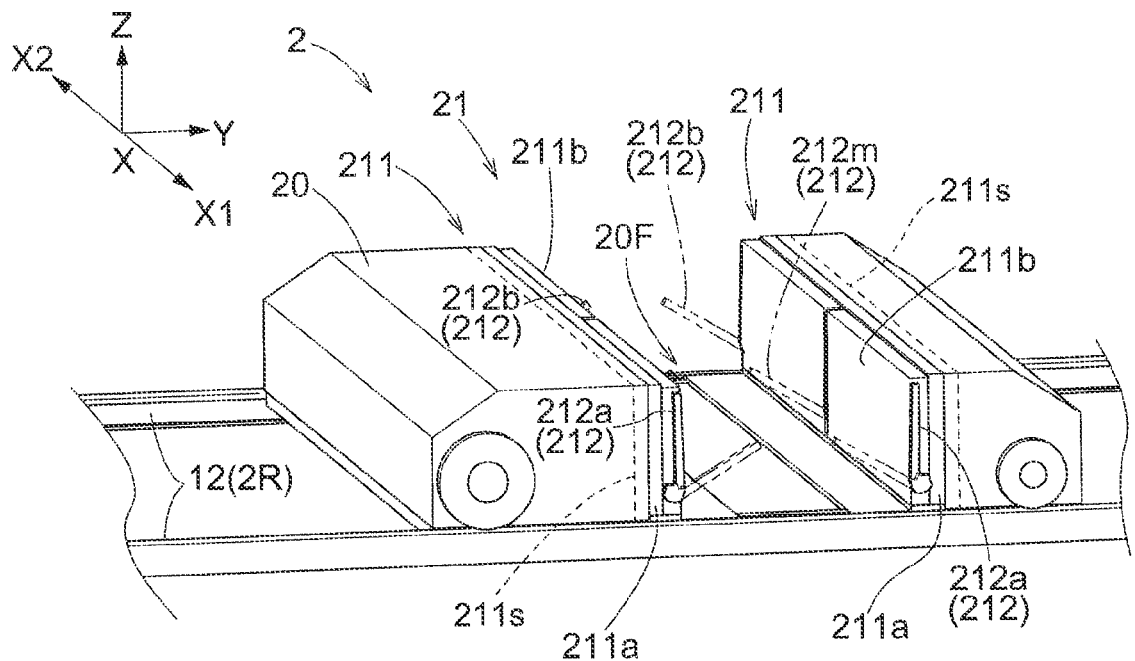
FIG. 3 is a perspective view showing relevant pars of a transport device.

As shown in FIGS. 3 and 4, the transfer machine 21 includes at least one locking part 212 configured to be locked to the front surface portion 901 of an article 90 facing the depth-direction near side X1 or the rear surface portion 902 of the article 90 that faces the depth-direction far side X2 (see FIG. 2), and a driver M (see FIG. 6) that moves the locking part 212. The transfer machine 21 is configured to transfer an article 90 to each storage section 13 by moving the article 90 in the depth direction X with the locking part 212 locked to the front surface portion 901 or the rear surface portion 902 of the article 90. As described above, the transfer operation executed by the transfer machine 21 includes the take-out operation of taking out an article 90 from each storage section 13, and the delivery operation of delivering an article 90 to another storage section 13.

In the present embodiment, the transfer machine 21 includes at least one transfer arm 211 configured to extend and retract in the depth direction X. Here, the transfer machine 21 includes a pair of transfer arms 211 disposed spaced apart in the width direction Y. The pair of transfer arms 211 are configured to extend and retract on opposite sides in the width direction Y relative to an article 90 to be transferred. That is, one of the two transfer arms 211 extends and retracts on the outer side in the width direction Y relative to one side surface portion 903 (see FIG. 2) of an article 90, and the other of the two transfer arms 211 extends and retracts on the outer side in the width direction Y relative to the other side surface portion 903 of the article 90. Each transfer arm 211 is driven to extend and retract in the depth direction X by an extension/retraction motor M1 (see FIG. 6).

In the present embodiment, each transfer arm 211 includes a supporting portion 211*s* that is fixed to the travel carriage 20, a first arm 211*a* supported in such a manner as to be movable in the depth direction X relative to the supporting portion 211*s*, and a second arm 211*b* supported in such a manner as to be movable in the depth direction X relative to the first arm 211*a*. Also, the first arm 211*a* moves in the depth direction X relative to the supporting portion 211*s*, and the first arm 211*a* and the second arm 211*b* move in the depth direction X relative to each other, whereby the transfer arm 211 stretches and contracts in the depth direction X. In the present embodiment, the locking part 212 is provided on the second arm 211*b*. With such a configuration, the transfer arm 211 can extend and retract in the depth direction X to move an article 90 in the depth direction X.

The locking part 212 that is locked to the article 90 as a result of the transfer operation is provided on each transfer arm 211. In the present example, the locking part 212 is provided on the second arm 211*b* of the transfer arm 211, and is configured to move in the depth direction X as the second arm 211*b* moves in the depth direction X. The locking part 212 is supported by the transfer arm 211 in such a manner as to be turnable about an axis extending in the depth direction X, and is configured to change between a protruding state of protruding from the transfer arm 211 toward the other transfer arm 211 in the width direction Y through the above-described turning, and a non-protruding state of not protruding toward the other transfer arm 211 in the width direction Y. The locking part 212 is disposed at a position that overlaps an article 90 to be transferred as viewed in the depth direction X in the protruding state, and is disposed at a position that does not overlap an article 90 to be transferred as viewed in the depth direction X in the non-protruding state.

Figure 6:
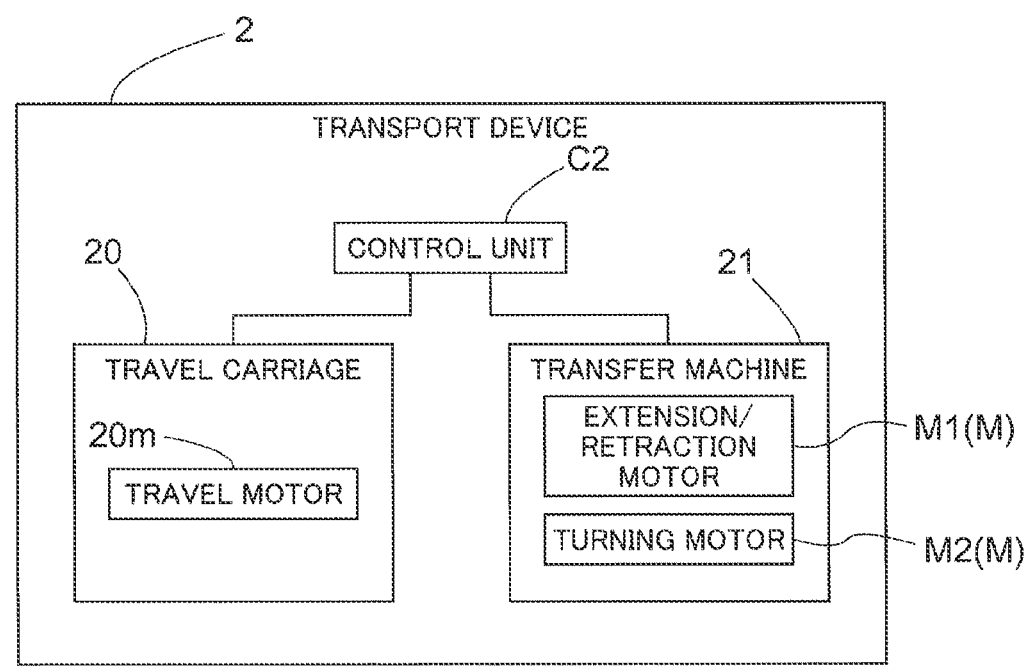
FIG. 6 is a control block diagram of the transport device.

In the present embodiment, the locking part 212 is driven to turn about the axis extending in the depth direction X by a turning motor M2 (see FIG. 6). In the present embodiment, the extension/retraction motor M1 for causing the transfer arm 211 to extend and retract and the turning motor M2 for turning the locking part 212 correspond to a "driver M". The driver M including the extension/retraction motor M1 and the turning motor M2 may include a mechanism and a device or the like (e.g., a motor) for realizing other operations of the transfer machine 21. For example, when the transfer machine 21 includes a motor (approaching/separation motor) for moving the two transfer arms 211 toward and away from each other in the width direction Y, the driver M may include this approaching/separation motor.

When executing the delivery operation of the transfer operation, the transfer machine 21 moves an article 90 to the depth-direction far side X2 by moving the article 90 to the depth-direction far side X2 with the locking part 212 locked to the front surface portion 901 of the article 90. When executing the take-out operation of the transfer operation, the transfer machine 21 moves an article 90 to the depth-direction near side X1 by moving the article 90 to the depth-direction near side X1 with the locking part 212 locked to the rear surface portion 902 of the article 90.

In the present embodiment, a plurality of locking parts 212 are disposed on each transfer arm 211 in a positional relationship in which the locking parts 212 are spaced apart from each other in the depth direction X. In the present example, the locking parts 212 include a first locking part 212a disposed at a position farthest in the depth direction X from a storage section 13 serving as a transfer target location, a second locking part 212b disposed at a position closest in the depth direction X to a storage section 13 serving as a transfer target location, and an intermediate locking part 212m disposed between the first locking part 212a and the second locking part 212b in the depth direction X. That is, when the depth-direction near side X1 and the depth-direction far side X2 are defined with reference to a storage section 13 serving as a transfer target location, the first locking part 212a is disposed at a portion of the transfer arm 211 on the depth-direction near side X1 (an end portion on the depth-direction near side X1 in the illustrated example), the second locking part 212b is disposed at a portion of the transfer arm 211 on the depth-direction far side X2 (an end portion on the depth-direction far side X2 in the illustrated example), and the intermediate locking part 212m is disposed between the locking parts 212a and 212b in the depth direction X. The first locking part 212a, the second locking part 212b, and the intermediate locking part 212m are provided for each of the two transfer arms 211. The pair of first locking parts 212a are disposed at the same position in the depth direction X relative to the corresponding transfer arms 211 (here, the corresponding second arms 211b), and are configured to be locked to an article 90 in cooperation with each other. The pair of second locking parts 212b and the pair of intermediate locking parts 212m are also configured in the same manner.

In the present embodiment, the first locking parts 212a serve to deliver the first article 91 to the first placement region A1 of each storage section 13 (see FIGS. 7(a)-(c)). The intermediate locking parts 212m serve to deliver the second article 92 to the second placement region A2 of each storage section 13 (see FIGS. 8(a)-(c)). The second locking parts 212b serve to take out the first article 91 placed in the first placement region A1 of each storage section 13, and to take out the second article 92 placed in the second placement region A2 of each storage section 13 (FIGS. 9(a)-(c) and 10(a)-(c)). In the present embodiment, as shown in FIG. 1, the storage sections 13 of each of the two article storage racks 1 may serve as transfer target locations. That is, depending on which of the two article storage racks 1 in which a storage section 13 specified as a transfer target location is provided, the relationship between the depth-direction near side X1 and the depth-direction far side X2 with respect to the transport device 2 may be reversed. In this case, the relationship between the first locking parts 212a and the second locking parts 212b may be also reversed. That is, depending on the storage section 13 serving as a transfer target location, the first locking parts 212a may be the second locking parts 212b. Also, the second locking parts 212b may be the first locking parts 212a.

Control Configuration of Article Storage Facility

Figure 5:
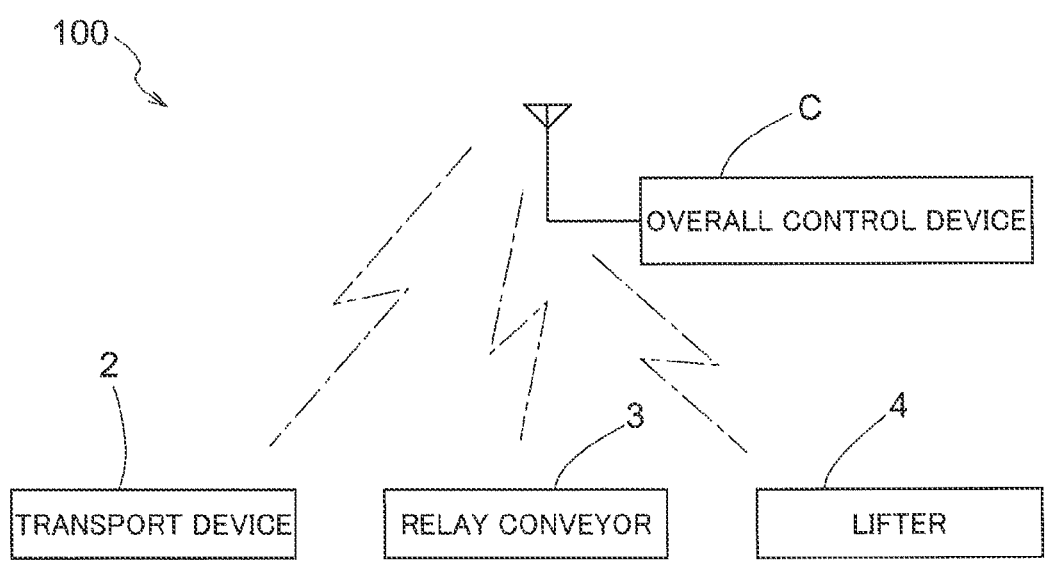
FIG. 5 is a control block diagram of the article storage facility.

As shown in FIG. 5, the article storage facility 100 includes an overall control device C that executes overall management of the entire facility. The overall control device C is configured to generate a transport instruction to transport an article 90 to any one of the plurality of storage sections 13 (see FIG. 1) included in each article storage rack 1, or from any one of the plurality of storage sections 13, and transmit the transport instruction to each transport device 2. In the present embodiment, the overall control device C is configured to transmit the above-described transport instruction to each transport device 2, each relay conveyor 3, and each lifter 4. The transport device 2, the relay conveyor 3, and the lifter 4 that have received the transport instruction transport the article 90 to a desired location in cooperation with each other.

As shown in FIG. 6, each transport device 2 includes a control unit C2 that controls actuation of the transport device 2. The control unit C2 is configured to control various functional units of the transport device 2. In the present embodiment, the control unit C2 is configured to control a travel motor 20m for driving the travel carriage 20 to travel, an extension/retraction motor M1 for driving the transfer arms 211 (see FIG. 3, etc.) of the transfer machine 21 to extend and retract, and a turning motor M2 for driving the locking parts 212 supported by the transfer arms 211 to turn. In the present embodiment, the control unit C2 included in each transport device 2 corresponds to a "control unit". As described above, in the present embodiment, the extension/retraction motor M1 and the turning motor M2 correspond to the "driver M".

The control unit C2 and the overall control device C described above each include, for example, a processor such as a microcomputer and a peripheral circuit such as a memory. Various functions are implemented by these pieces of hardware working cooperatively with a program executed on a processor such as a computer.

Transfer Operation

Next, the transfer operation of an article 90 executed by each transfer machine 21 will be described with reference to FIGS. 7(a)-(c) to 11(a)-(e). Since FIGS. 7(a)-(c) to 11(a)-(e) are explanatory diagrams schematically illustrating the transfer operation, the configurations of the details (e.g., the width direction restricting members 14y, the depth direction restricting member 14x, etc.) have been omitted.

The transfer operation executed by the transfer machine 21 includes a take-out operation of taking out an article 90 from each storage section 13, and a delivery operation of delivering an article 90 to each storage section 13. As shown in FIG. 6, the transfer operation executed by the transfer machine 21 is achieved by the control of the driver M (the extension/retraction motor M1 and the turning motor M2) performed by the control unit C2. The following description will be given with reference to FIG. 6 as well.

In the present embodiment, the delivery operation includes a first article delivery operation of delivering the first article 91 to the first placement region A1 of each storage section 13, and a second article delivery operation of delivering the second article 92 to the second placement region A2 of each storage section 13. The take-out operation includes a first article take-out operation of taking out the first article 91 placed in the first placement region A1 of each storage section 13, and a second article take-out operation of taking out the second article 92 placed in the second placement region A2 of each storage section 13.

FIGS. 7(a)-(c) shows the transfer machine 21 executing the first article delivery operation. The control unit C2 controls the driver M to cause the transfer machine 21 to execute the first article delivery operation. As shown in FIGS. 7(a)-(c), in the first article delivery operation, the control unit C2 controls the driver M to move the first locking parts 212a (locking parts 212) to the depth-direction far side X2 with the first locking parts 212a locked to the front surface portion 911 of the first article 91, to push the first article 91 toward the depth-direction far side X2. Specifically, the control unit C2 controls the turning motor M2 to cause the first locking parts 212a to protrude in the width direction Y, and controls the extension/retraction motor M1 to cause the transfer arms 211 to protrude toward the depth-direction far side X2 (see FIGS. 7(*a*) and 7(*b*) in FIGS. 7(*a*)-(*c*)). In this manner, the control unit C2 causes the transfer machine 21 to execute the first article delivery operation. In the first article delivery operation, the first article 91 that has been pushed by the first locking parts 212*a* is placed in the first placement region A1 and disposed in the first article proper position P1 in such a manner as to slide on the support surface 20F of the travel carriage 20 and the placement surface 13F of the storage section 13.

The amount of protrusion of the transfer arms 211 toward the depth-direction far side X2 in the first article delivery operation is controlled based on the length in the depth direction X of the first article 91 and the first article proper position P1. After the first article 91 has been disposed at the first article proper position P1, the control unit C2 controls the extension/retraction motor M1 to cause the transfer arms 211 to retract toward the depth-direction near side X1 (see FIG. 7(*c*) in FIGS. 7(*a*)-(*c*)). In the present example, concurrently with or after the retraction of the transfer arms 211 toward the depth-direction near side X1, the control unit C2 controls the turning motor M2 to bring the first locking parts 212*a* into the non-protruding state.

FIGS. 8(*a*)-(*c*) shows the transfer machine 21 executing the second article delivery operation. The control unit C2 controls the driver M to cause the transfer machine 21 to execute the second article delivery operation. As shown in FIGS. 8(*a*)-(*c*), in the second article delivery operation, the control unit C2 controls the driver M to move the intermediate locking parts 212*m* (locking parts 212) to the depth-direction far side X2 with the intermediate locking parts 212*m* locked to the front surface portion 921 of the second article 92, to push the second article 92 toward the depth-direction far side X2. Specifically, the control unit C2 controls the turning motor M2 to cause the intermediate locking parts 212*m* to protrude in the width direction Y, and controls the extension/retraction motor M1 to cause the transfer arms 211 to protrude toward the depth-direction far side X2 (see FIGS. 8(*a*) and 8(*b*) in FIGS. 8(*a*)-(*c*)). In the present embodiment, in a reference state, which is a state of the transfer arms 211 while the travel carriage 20 is traveling, the intermediate locking parts 212*m* are located further toward the depth-direction far side X2 than the front surface portion 921 of the second article 92 is. Therefore, in the second article delivery operation, the transfer arms 211 are temporarily moved to the depth-direction near side X1 to lock the intermediate locking parts 212*m* to the front surface portion 921 of the second article 92, and subsequently an operation of causing the transfer arms 211 to protrude toward the depth-direction far side X2 is executed. In this manner, the control unit C2 causes the transfer machine 21 to execute the second article delivery operation. In the second article delivery operation, the second article 92 that has been pushed by the intermediate locking parts 212*m* is placed in the second placement region A2 and disposed at the second article proper position P2 in such a manner as to slide on the support surface 20F of the travel carriage 20 and the placement surface 13F of the storage section 13.

The amount of protrusion of the transfer arms 211 toward the depth-direction far side X2 in the second article delivery operation is controlled based on the length in the depth direction X of the second article 92 and the second article proper position P2. After the second article 92 has been disposed at the second article proper position P2, the control unit C2 controls the extension/retraction motor M1 to cause the transfer arms 211 to retract toward the depth-direction near side X1 (see FIG. 8(*c*) in FIGS. 8(*a*)-(*c*)). In the present example, concurrently with or after the retraction of the transfer arms 211 toward the depth-direction near side X1, the control unit C2 controls the turning motor M2 to bring the intermediate locking parts 212*m* into the non-protruding state.

FIGS. 9(*a*)-(*c*) shows the transfer machine 21 executing the first article take-out operation. The control unit C2 controls the driver M to cause the transfer machine 21 to execute the first article take-out operation. As shown in FIGS. 9(*a*)-(*c*), in the first article take-out operation, the control unit C2 controls the driver M to dispose the second locking parts 212*b* (locking parts 212) between the first article 91 and the second article 92 in the depth direction X, and subsequently to move the second locking parts 212*b* to the depth-direction near side X1 with the second locking parts 212*b* locked to the rear surface portion 912 of the first article 91. Specifically, the control unit C2 controls the extension/retraction motor M1 to cause the transfer arms 211 to protrude toward the depth-direction far side X2, and subsequently controls the turning motor M2 to cause the second locking parts 212*b* to protrude in the width direction Y with the second locking parts 212*b* located between the first article 91 and the second article 92 in the depth direction X, thereby disposing the second locking parts 212*b* between the first article 91 and the second article 92 in the depth direction X (see FIGS. 9(*a*) and 9(*b*) in FIGS. 9(*a*)-(*c*)). Subsequently, the control unit C2 controls the extension/retraction motor M1 to cause the transfer arms 211 to retract toward the depth-direction near side X1, thereby causing the second locking parts 212*b* to be locked to the rear surface portion 912 of the first article 91 and to be moved toward the depth-direction near side X1, to pull the first article 91 toward the depth-direction near side X1 (see FIG. 9(*c*) in FIGS. 9(*a*)-(*c*)). In this manner, the control unit C2 causes the transfer machine 21 to execute the first article take-out operation. In the first article take-out operation, the first article 91 that has been pulled by the second locking parts 212*b* is placed on the support surface 20F of the travel carriage 20 in such a manner as to slide on the placement surface 13F of the storage section 13 and the support surface 20F of the travel carriage 20.

The amount of protrusion of the transfer arms 211 toward the depth-direction far side X2 when the second locking parts 212*b* are disposed between the second article 92 and the first article 91 in the depth direction X in the first article take-out operation is controlled based on the first article proper position P1. More specifically, the above-described amount of protrusion is controlled with reference to a position farther toward the depth-direction far side X2 by a predetermined distance than the position of the rear surface portion 912 of the first article 91 that is assumed to be located at the first article proper position P1, taking into account displacement in the depth direction X of the first article 91 stored in the storage section 13, a control error (e.g., an error in the amount of protrusion of the transfer arms 211) of the control unit C2, a mechanical error (e.g., an installation error between the article storage rack 1 and the transport device 2) of the article storage facility 100, and the like. However, the present disclosure is not limited to such a configuration. For example, the transfer machine 21 may include a detector that detects the position of the first article 91 in the depth direction X. In this case, the control unit C2 may control the amount of protrusion of the transfer arms 211 based on a result of detection by the detector. As such a detector, it is possible to use, for example, a sensor or the like that detects the presence or absence of the first article 91 at various positions in the depth direction X while the transfer arms 211 are caused to protrude toward the depth-direction far side X2. In this case, the control unit C2 may control the amount of protrusion of the transfer arms 211 based on a position at which the result of detection by the detector indicates a change from "Article present" to "Article absent". The second locking parts 212*b* can be disposed at an appropriate position by causing the second locking parts 212*b* to protrude in the width direction Y at a position located further toward the depth-direction far side X2 by a certain distance than the position at which the result indicates a change from "Article present" to "Article absent".

FIGS. 10(*a*)-(*c*) shows the transfer machine 21 executing the second article take-out operation. The control unit C2 controls the driver M to cause the transfer machine 21 to execute the second article take-out operation. As shown in FIGS. 10(*a*)-(*c*), in the second article take-out operation, the control unit C2 controls the driver M to dispose the second locking parts 212*b* (locking parts 212) further toward the depth-direction far side X2 than the second article 92, and subsequently to move the second locking parts 212*b* to the depth-direction near side X1 with the second locking parts 212*b* locked to the rear surface portion 922 of the second article 92. Specifically, the control unit C2 controls the extension/retraction motor M1 to cause the transfer arms 211 to protrude toward the depth-direction far side X2, and subsequently controls the turning motor M2 to cause the second locking parts 212*b* to protrude in the width direction Y with the second locking parts 212*b* located further toward the depth-direction far side X2 than the rear surface portion 922 of the second article 92, thereby disposing the second locking parts 212*b* further toward the depth-direction far side X2 than the second article 92 (see FIGS. 10(*a*) and 10(*b*) in FIGS. 10(*a*)-(*c*)). Subsequently, the control unit C2 controls the extension/retraction motor M1 to cause the transfer arms 211 to retract toward the depth-direction near side X1, thereby causing the second locking parts 212*b* to be locked to the rear surface portion 922 of the second article 92 and to be moved to the depth-direction near side X1, to pull the second article 92 toward the depth-direction near side X1 (see FIG. 10(*c*) in FIGS. 10(*a*)-(*c*)). In this manner, the control unit C2 causes the transfer machine 21 to execute the second article take-out operation. In the second article take-out operation, the second article 92 that has been pulled by the second locking parts 212*b* is placed on the support surface 20F of the travel carriage 20 in such a manner as to slide on the placement surface 13F of the storage section 13 and the support surface 20F of the travel carriage 20.

The amount of protrusion of the transfer arms 211 toward the depth-direction far side X2 when the second locking parts 212*b* are disposed further toward the depth-direction far side X2 than the second article 92 in the second article take-out operation is controlled based on the second article proper position P2. More particularly, the above-described amount of protrusion is controlled with reference to a position farther toward the depth-direction far side X2 by a predetermined distance than the position of the rear surface portion 922 of the second article 92 that is assumed to be located at the second article proper position P2, taking into account displacement in the depth direction X of the second article 92 stored in the storage section 13, a control error (e.g., an error in the amount of protrusion of the transfer arms 211) of the control unit C2, a mechanical error (e.g., an installation error between the article storage rack 1 and the transport device 2) of the article storage facility 100, and the like. As described above, in the present embodiment, the depth direction restricting member 14*x* that restricts the movement of the second article 92 toward the depth-direction far side X2 is provided in the storage section 13 (see FIG. 2). Accordingly, for example, even if the second article 92 vibrates in the storage section 13, the second article 92 is less likely to move further toward the depth-direction far side X2 past the above-described depth direction restricting member 14*x*. Therefore, it is preferable that the amount of protrusion of the transfer arms 211 toward the depth-direction far side X2 when the second locking parts 212*b* are disposed further toward the depth-direction far side X2 than the second article 92 is controlled based on the position at which the depth direction restricting member 14*x* is disposed. This can prevent the second locking parts 212*b* from interfering with the side surface portions 923 of the second article 92, thus making it possible to dispose the second locking parts 212*b* at an appropriate position. However, the present disclosure is not limited to the above-described configuration. As described above, the transfer machine 21 may include a detector that detects the position of the second article 92 in the depth direction X. Although a detailed description has been omitted, in this case, the control unit C2 may control the amount of protrusion of the transfer arms 211 based on a result of detection by the detector.

Here, in the article storage facility 100, the article storage racks 1 may vibrate due to the operation or the like of the transport devices 2, resulting in displacement of the articles 90 stored in the storage sections 13. In order to correct such displacement, the transfer machines 21 can be used to adjust the positions of the articles 90. However, in the case where two articles 90 are stored in a storage section 13 in such a manner as to be arranged in the depth direction X, when the position of an article 90 (second article 92) that is stored on the depth-direction far side X2 is adjusted, an article 90 (first article 91) that is located on the depth-direction near side X1 relative to the article 90 (second article 92) may act as an impediment. For this reason, it has been hitherto necessary to temporarily transport the first article 91 to another location before adjusting the position of the second article 92. Accordingly, it has not been possible to efficiently adjust the position of the second article 92. On the other hand, as will be described below, the article storage facility 100 according to the present disclosure enables efficient adjustment of the position of an article 90 (second article 92) that is disposed on the depth-direction far side X2 in a configuration including at least one storage section 13 capable of storing two articles 90 arranged in the depth direction X.

Each transfer machine 21 is configured to execute a position adjustment operation of adjusting an article 90 stored in each storage section 13, in addition to the delivery operation of delivering an article 90 to each storage section 13 and the take-out operation of taking out an article 90 from each storage section 13. The position adjustment operation includes a second article position adjustment operation of positioning the second article 92 stored in each storage section 13 at the second article proper position P2.

Portions of FIGS. 11(*a*)-(*e*), namely FIGS. 11(*b*) and 11(*c*) in FIGS. 11(*a*)-(*e*), show the transfer machine 21 executing the second article position adjustment operation. The control unit C2 is configured to control the driver M to cause the transfer machine 21 to execute the second article position adjustment operation. That is, as shown in FIGS. 11(*b*) and 11(*c*) in FIGS. 11(*a*)-(*e*), in the second article position adjustment operation, the control unit C2 controls the driver M to cause the transfer machine 21 to execute an operation in which the second locking parts 212*b* (locking parts 212) disposed between the first article 91 and the second article 92 in the depth direction X are moved toward the depth-direction far side X2 to a position corresponding to the position of the front surface portion 921 of the second article 92 located at the second article proper position P2. In the example shown in FIGS. 11(a) and 11(b) in FIGS. 11(a)-(e), the second article 92 has shifted from the second article proper position P2 toward the depth-direction near side X1. In such a case, the control unit C2 controls the extension/retraction motor M1 to cause the transfer arms 211 to protrude toward the depth-direction far side X2 with the second locking parts 212b disposed between the first article 91 and the second article 92 in the depth direction X, thereby locking the second locking parts 212b to the front surface portion 921 of the second article 92. Subsequently, the control unit C2 controls the extension/retraction motor M1 to cause the transfer arms 211 to protrude further toward the depth-direction far side X2 to move the second locking parts 212b further toward the depth-direction far side X2, to push the second article 92 toward the depth-direction far side X2 in such a manner as to be disposed at the second article proper position P2 (see FIG. 11(c) in FIGS. 11(a)-(e)). In this manner, the control unit C2 causes the transfer machine 21 to execute the second article position adjustment operation.

The amount of protrusion of the transfer arms 211 toward the depth-direction far side X2 when the second article 92 is positioned at the second article proper position P2 in the second article position adjustment operation is controlled based on the length in the depth direction X of the second article 92 and the second article proper position P2. For example, as illustrated, when the second article proper position P2 is defined with reference to the position of the rear surface portion 922 (the position indicated by "P2") of the second article 92 that is assumed to be located at the second article proper position P2 (the second article 92 need not be actually disposed at the second article proper position P2), the position of the rear surface portion 922 is constant regardless of the length in the depth direction X of the second article 92. In this case, the amount of protrusion of the transfer arm 211 is controlled such that the second locking parts 212b are disposed at a position spaced toward the depth-direction near side X1 from the position of the rear surface portion 922 of the second article 92 that is assumed to be located at the second article proper position P2 by a distance corresponding to the length in the depth direction X of the second article 92. Accordingly, for example, in the case where the length in the depth direction X of the second articles 92 is not uniform, and the second article proper position P2 is defined with reference to the position of the rear surface portion 922 of the second article 92, the control unit C2 controls the amount of protrusion of the transfer arms 211 in the second article position adjustment operation such that the longer the length in the depth direction X of a target second article 92, the smaller the amount of protrusion of the transfer arms 211, and the shorter the length in the depth direction X of a target second article 92, the greater the amount of protrusion of the transfer arms 211.

In the article storage facility 100, in order to execute such a second article position adjustment operation, the control unit C2 utilizes the operation executed by the transfer machine 21 for the first article take-out operation. That is, after the second locking parts 212b (locking parts 212) have been disposed between the first article 91 and the second article 92 during execution of the first article take-out operation using the transfer machine 21, the control unit C2 causes the transfer machine 21 to execute the second article position adjustment operation, and to complete the first article take-out operation upon completion of the second article position adjustment operation.

Specifically, as shown in FIGS. 11(a) and 11(b) in FIGS. 11(a)-(e), the control unit C2 causes the transfer machine 21 to start the first article take-out operation to dispose the second locking parts 212b between the first article 91 and the second article 92 in the depth direction X. Next, as shown in FIGS. 11(b) and 11(c) in FIGS. 11(a)-(e), the control unit C2 cause the second locking parts 212b to move toward the depth-direction far side X2 to a position corresponding to the position of the front surface portion 921 of the second article 92 that is assumed to be located at the second article proper position P2, thereby causing the transfer machine 21 to execute the second article position adjustment operation. Once the second article position adjustment operation has been completed, the control unit C2 causes the transfer machine 21 to continue the first article take-out operation (FIG. 11(e) in FIGS. 11(a)-(e)). Accordingly, the second article position adjustment operation is executed during execution of the first article take-out operation. Therefore, if a second article 92 has shifted toward the depth-direction near side X1 before execution of the second article position adjustment operation, the second article 92 can be positioned at the second article proper position P2, and the first article 91 can be taken out from the storage section 13. Thus, with the present configuration, the position of the second article 92 stored on the depth-direction far side X2 relative to a first article 91 to be taken out can be adjusted using the operation of moving the second locking parts 212b (locking parts 212) in order to take out the first article 91. Therefore, it is possible to efficiently adjust the position of the second article 92.

In the present embodiment, when the control unit C2 causes the transfer machine 21 to execute the second article position adjustment operation during execution of the first article take-out operation using the transfer machine 21, the control unit C2 causes the transfer machine 21 to, after the second locking parts 212b (locking part 212) have been disposed between the first article 91 and the second article 92, move the second locking parts 212b toward the depth-direction far side X2 to complete the second article position adjustment operation, without moving the second locking parts 212b to the depth-direction near side X1. Once the second article position adjustment operation has been completed, the control unit C2 causes the second locking parts 212b to move toward the depth-direction near side X1 to complete the first article take-out operation. That is, when the second article position adjustment operation is executed during the first article take-out operation, the control unit C2 controls the operation of the transfer machine 21 in such a manner as to minimize the amount of movement in the depth direction X of the second locking part 212b. This makes it possible to reduce unnecessary operations executed by the transfer machine 21 when executing the second article position adjustment operation, thus more efficiently adjusting the position of the second article 92.

In the present embodiment, each time the control unit C2 causes the transfer machine 21 to execute the first article take-out operation, the control unit C2 causes the transfer machine 21 to execute the second article position adjustment operation during execution of the first article take-out operation. In other words, the control unit C2 causes the transfer machine 21 to execute the second article position adjustment operation during execution of the first article take-out operation, regardless of whether or not the second article 92 is displaced. For example, even if the second article 92 stored in a storage section 13 is located at the second article proper position P2 before execution of the first article take-out operation, the control unit C2 causes the transfer machine 21 to execute the second article position adjustment operation during execution of the first article take-out operation using the transfer machine 21. In this case, even if the second article position adjustment operation is executed, the second article 92 will not be moved toward the depth-direction far side X2 as a result of the second locking parts 212b moving toward the depth-direction far side X2. However, as a result of the control unit C2 causing the transfer machine 21 to execute the second article position adjustment operation each time the control unit C2 causes the transfer machine 21 to execute the first article take-out operation, the position adjustment for each of a plurality of second articles 92 stored in each article storage rack 1 can be performed at certain intervals. Accordingly, it is possible to reduce the likelihood of the position of the second article 92 being significantly shifted from the second article proper position P2. The present configuration can eliminate the need for a detection device or the like for detecting whether or not the second article 92 is actually displaced. Accordingly, the configuration of the article storage facility 100 can be simplified. Since the second article position adjustment operation is executed during execution of the first article take-out operation, the second article position adjustment operation is completed by simply causing the second locking parts 212b to reciprocate in the depth direction X by a predetermined distance from a state in which the second locking parts 212b are disposed between the first article 91 and the second article 92 in the depth direction X. Accordingly, it is possible to reduce unnecessary operations executed by the transfer machine 21 resulting from causing the transfer machine 21 to execute the second article position adjustment operation.

Other Embodiments

Next, other embodiments of the article storage facility will be described.

(1) The above embodiment has described an example in which the control unit C2 causes the transfer machine 21 to execute the second article position adjustment operation during execution of the first article take-out operation, each time the control unit C2 causes the transfer machine 21 to execute the first article take-out operation. However, the present disclosure is not limited to such an example, and the control unit C2 may cause the transfer machine 21 to execute the second article position adjustment operation during execution of the first article take-out operation, if a preset condition is satisfied. For example, the longer the length of time that has elapsed since the second article 92 was stored in a storage section 13, the more likely it is that the second article 92 will have shifted from the second article proper position P2 due to vibrations or the like of the article storage rack 1. For this reason, the above-described preset condition may include, for example, a condition that the length of time that has elapsed since the second article 92 was stored in the storage section 13 is greater than or equal to a predetermined threshold. In this case, for a second article 92 for which the length of time from when the second article 92 was stored in the storage section 13 exceeds the threshold, the control unit C2 causes the transfer machine 21 to execute the second article position adjustment operation during execution of the first article take-out operation. This makes it possible to cause the transfer machine 21 to execute the second article position adjustment operation during execution of the first article take-out operation, on a second article 92 that is highly likely to have become displaced.

(2) The present disclosure is not limited thereto, and the above-described preset condition may include a condition that displacement is detected by a detector for detecting displacement of the second article 92 stored in the storage section 13. In this case, for a second article 92 for which displacement has been detected, the control unit C2 causes the transfer machine 21 to execute the second article position adjustment operation during execution of the first article take-out operation. For example, the transfer arms 211 may each be provided with a detector for detecting the position of the articles 90. When executing the first article take-out operation, the transfer arms 211 may be caused to protrude in such a manner as to cause the detectors to reach the second placement region A2 in which the second article 92 is placed, to detect displacement of the second article 92. In this case, it is preferable that the detectors are attached to distal end portions in the depth-direction far side X2 of the corresponding transfer arms 211. Also, if displacement of the second article 92 is detected by the detectors, the control unit C2 may use the second locking parts 212b or the intermediate locking parts 212m to execute the second article position adjustment operation. When the second article position adjustment operation is executed using the second locking parts 212b disposed at the distal end portions in the depth-direction far side X2 of the transfer arms 211, the transfer arms 211 may be temporarily caused to retract toward the depth-direction near side X1 such that the second locking parts 212b are disposed further toward the depth-direction near side X1 than the front surface portion 921 of the second article 92 is, and subsequently the second article position adjustment operation may be executed. When the second article position adjustment operation is executed using the intermediate locking parts 212m disposed at intermediate portions in the depth direction X of the transfer arms 211, if the intermediate locking parts 212m are disposed further toward the depth-direction near side X1 than the front surface portion 921 of the second article 92 is at a time point at which displacement of the second article 92 has been detected by the above-described detector, it is possible to cause the transfer machine 21 to execute the second article position adjustment operation without causing the transfer arms 211 to retract toward the depth-direction near side X1. If the intermediate locking parts 212m are disposed further toward the depth-direction far side X2 than the front surface portion 921 of the second article 92 is at a time point at which displacement of the second article 92 has been detected by the above-described detector, the intermediate locking parts 212m may be disposed further toward the depth-direction near side X1 than the front surface portion 921 of the second article 92 by temporarily causing the transfer arms 211 to retract toward the depth-direction near side X1, as in the above-described case where the second locking parts 212b are used.

(3) The above embodiment has described an example in which each storage section 13 includes width direction restricting members 14y protruding upward from the placement surface 13F on opposite sides in the width direction Y relative to each of the first placement region A1 and the second placement region A2. However, the width direction restricting members 14y are not essential components of the article storage facility 100, and do not necessarily need to be provided in the storage section 13.

(4) The above embodiment has described an example in which each storage section includes a depth direction restricting member 14x protruding upward from the placement surface 13F on the depth-direction far side X2 relative to the second placement region A2. However, the depth direction restricting member 14x is not an essential component of the article storage facility 100, and does not necessarily need to be provided in the storage section 13.

(5) The above embodiment has described an example in which each of the locking parts 212 is configured to change between a protruding state of protruding toward the other transfer arm 211 in the width direction Y, and a non-protruding state of not protruding toward the other transfer arm 211 by turning relative to the corresponding transfer arm 211 about an axis extending in the depth direction X. However, the present disclosure is not limited to such an example, and each of the locking parts 212 may be supported in such a manner as to be turnable relative to the corresponding transfer arm 211 about an axis extending in the vertical direction Z, and may be configured to change between the protruding state and the non-protruding state by turning about the axis extending in the vertical direction Z. Alternatively, each of the locking parts 212 may be supported in such a manner as to move in the width direction Y relative to the corresponding transfer arm 211, and may be configured to change between the protruding state and the non-protruding state.

(6) The above embodiment has described an example in which the locking parts 212 supported by one transfer arm 211 of the two transfer arms 211 are configured to change between the protruding state of protruding toward the other transfer arm 211 in the width direction Y, and the non-protruding state of not protruding toward the other transfer arm 211. However, the present disclosure is not limited to such an example, and the locking parts 212 may be fixed to and supported by the corresponding transfer arms 211 in such a manner as to be constantly in the protruding state. In this case, the two transfer arms 211 that support the respective locking parts 212 may be configured to move toward and away from each other in the width direction Y. The two locking parts 212 may be disposed at a position overlapping the article 90 as viewed in the depth direction X by moving the two transfer arms 211 toward each other in the width direction Y, and the two locking parts 212 may be disposed at a position that does not overlap the article 90 as viewed in the depth direction X by moving the two transfer arms 211 away from each other in the width direction Y. Such a configuration can also realize a configuration that enables the locking parts 212 to be locked to the front surface portion 901 or the rear surface portion 902 of the article 90.

(7) The above embodiment has described an example in which three locking parts 212 are provided for each of the two transfer arms 211. However, the present disclosure is not limited to such an example, and two or fewer locking parts 212 or four or more locking parts 212 may be provided for each of the two transfer arms 211. In addition, the above embodiment has described an example in which the intermediate locking parts 212m are disposed at a central position of the space between the first locking parts 212a and the second locking parts 212b in the depth direction X. However, the present disclosure is not limited thereto, and the intermediate locking parts 212m may be disposed on a side closer to the first locking parts 212a, or a side closer to the second locking parts 212b, than the central position of the space between the first locking parts 212a and the second locking parts 212b. In such a case, the space between the first locking parts 212a and the intermediate locking parts 212m in the depth direction X, or the space between the intermediate locking parts 212m and the second locking parts 212b in the depth direction X may be set according to the length in the depth direction X of the article 90, or may be set to be larger than the length in the article 90 of the depth direction X.

Figure 12:
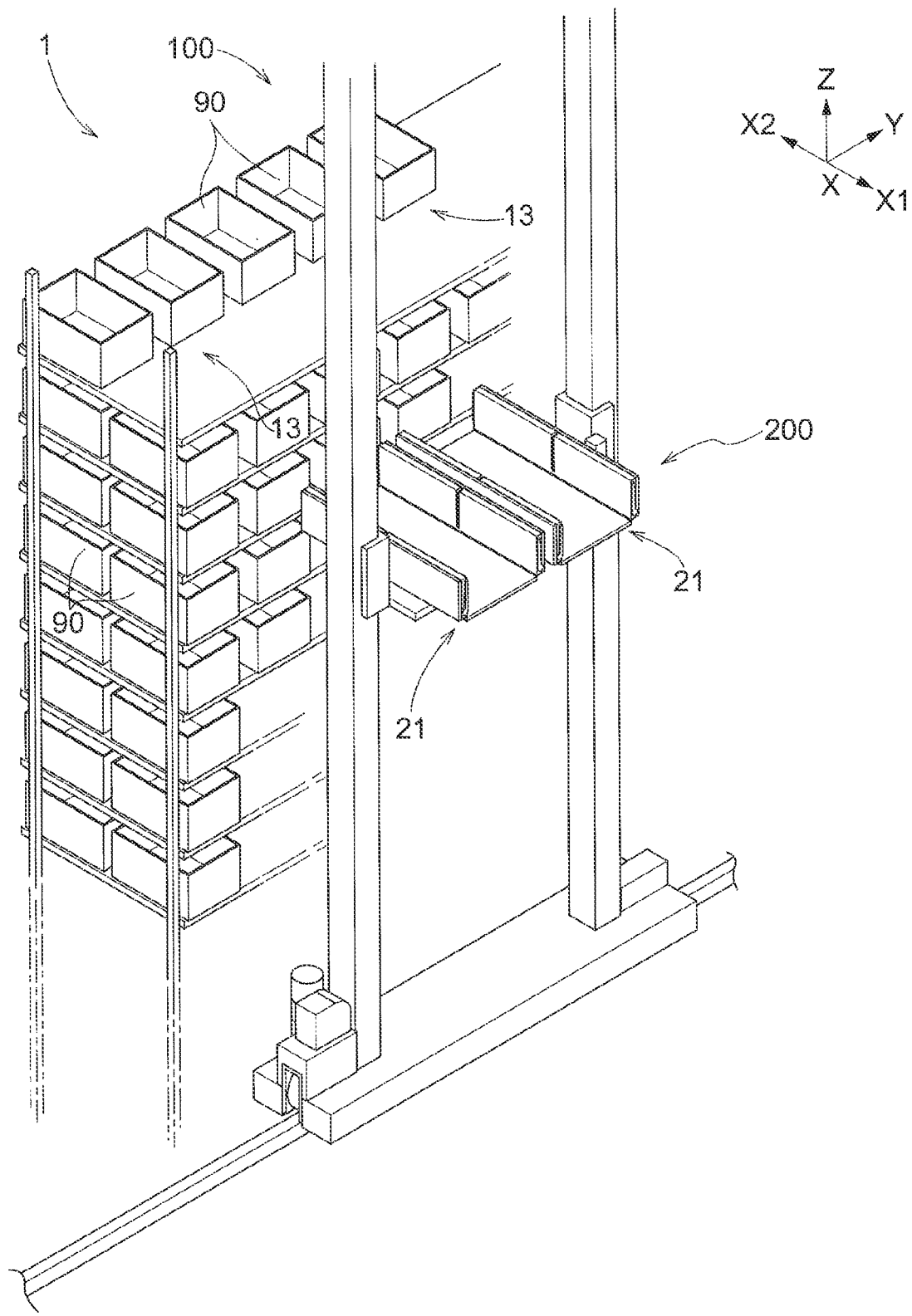
FIG. 12 is a schematic perspective view showing an article storage facility according to another embodiment.

(8) In addition to the configuration described in the above embodiment, a stacker crane 200 configured to move the transfer machine 21 in the vertical direction Z and the width direction Y as shown in FIG. 12, for example, may be used as the transport device 2. Although FIG. 12 shows a configuration in which one stacker crane 200 includes a plurality of transfer machines 21 (two transfer machines 21), it is possible to adopt a configuration in which one stacker crane 200 includes one transfer machine 21.

(9) Note that the configurations disclosed in the embodiments described above are applicable in combination with configurations disclosed in other embodiments as long as no inconsistency arises. With regard to the other configurations as well, the embodiments disclosed herein are illustrative in all respects. Therefore, various modifications and alterations may be made as appropriate without departing from the gist of the present disclosure.

Outline of the Embodiment

The article storage facility described above will be described below.

The article storage facility includes:
an article storage rack including a storage section capable of storing two articles arranged in a depth direction;
a transport device configured to transport the articles in a transport direction intersecting the depth direction; and
a control unit configured to control actuation of the transport device,
wherein the transport device includes a transfer machine configured to execute a take-out operation of moving the articles in the depth direction to take out the articles from the article storage rack,
when a side on which the transport device is located relative to the article storage rack in the depth direction is defined as a depth-direction near side, a side opposite to the depth-direction near side is defined as a depth-direction far side, the article stored on the depth-direction near side of the storage section is defined as a first article, the article stored on the depth-direction far side of the storage section is defined as a second article, and a proper position of the second article in the storage section is defined as a second article proper position,
the transfer machine includes a locking part configured to be locked to either a front surface portion of each of the articles that faces the depth-direction near side or a rear surface portion of each of the articles that faces the depth-direction far side, and a driver configured to move the locking part,
the control unit is capable of controlling the driver to cause the transfer machine to execute:
a first article take-out operation of disposing the locking part between the first article and the second article in the depth direction, and subsequently moving the locking part to the depth-direction near side with the locking part locked to the rear surface portion of the first article, to execute the take-out operation on the first article; and
a second article position adjustment operation of moving the locking part disposed between the first article and the second article in the depth direction toward the depth-direction far side to a position corresponding to a position of the front surface portion of the second article located at the second article proper position, and
the control unit is configured to, after the locking part has been disposed between the first article and the second article during execution of the first article take-out operation using the transfer machine, cause the transfer machine to execute the second article position adjustment operation, and to complete the first article take-out operation upon completion of the second article position adjustment operation.

With the present configuration, the transfer machine executes the second article position adjustment operation to move the locking part toward the depth-direction far side to a position corresponding to a position of the front surface portion of the second article located at the second article proper position. Thus, even if the second article has shifted from the second article proper position toward the depth-direction near side before execution of the second article position adjustment operation, the second article can be moved to the depth-direction far side to be positioned at the second article proper position using the locking part. Also, with the present configuration, such a second article position adjustment operation is executed after the locking part has been disposed between the first article and the second article during execution of the first article take-out operation. Accordingly, the position of a second article that is stored on the depth-direction far side relative to a first article to be taken out can be adjusted using an operation of moving the locking part in order to take out the first article. Therefore, with the present configuration, it is possible to efficiently adjust the position of the second article stored on the depth-direction far side of the storage section.

Here, it is preferable that the control unit is configured to, when the control unit causes the transfer machine to execute the second article position adjustment operation during execution of the first article take-out operation using the transfer machine, cause the transfer machine to, after the locking part has been disposed between the first article and the second article, move the locking part toward the depth-direction far side to complete the second article position adjustment operation, without moving the locking part to the depth-direction near side.

With the present configuration, it is possible to reduce unnecessary operations executed by the transfer machine when executing the second article position adjustment operation, thus more efficiently adjusting the position of the second article.

It is preferable that the control unit is configured to, each time the control unit causes the transfer machine to execute the first article take-out operation, cause the transfer machine to execute the second article position adjustment operation during execution of the first article take-out operation.

With the present configuration, the second article position adjustment operation is executed during execution of the first article take-out operation, regardless of whether or not the second article is displaced. This eliminates the need for a detection device or the like for detecting whether or not the second article is actually displaced.

It is preferable that when a proper position of the first article in the storage section is defined as a first article proper position, a surface of the storage section on which the articles are placed is defined as a placement surface, a region of the placement surface in which the first article at the first article proper position is placed is defined as a first placement region, a region of the placement surface in which the second article at the second article proper position is placed is defined as a second placement region, and a direction orthogonal to the depth direction in a plan view is defined as a width direction, the storage section includes width direction restricting members protruding upward from the placement surface on opposite sides in the width direction relative to each of the first placement region and the second placement region.

With the present configuration, the position in the width direction of each of the first article and the second article can be restricted using the width direction restricting members. Accordingly, when the locking part is moved toward the depth-direction far side in order to dispose the locking part between the first article and the second article in the depth direction, it is possible to reduce the likelihood that the locking part will interfere with the first article or the second article. Therefore, the present configuration facilitates appropriate execution of the operations of the transfer machine such as the first article take-out operation and the second article position adjustment operation.

It is preferable that the storage section includes a depth direction restricting member protruding upward from the placement surface on the depth-direction far side relative to the second placement region.

With the present configuration, it is possible to suppress movement of the second article further toward the depth-direction far side past the depth direction restricting member. In addition, if the second article is displaced toward the depth-direction near side, the second article can be positioned at the second article proper position through the above-described second article position adjustment operation. Therefore, with the present configuration, the second article can be positioned within a proper range in the depth direction.

INDUSTRIAL APPLICABILITY

The technique according to the present disclosure is applicable to an article storage facility including an article storage rack including a storage section capable of storing articles, and a transport device that transports the articles.

DESCRIPTION OF REFERENCE SIGNS

100: Article storage facility
1: Article storage rack
13: Storage section
13F: Placement surface
14$x$: Depth direction restricting member
14$y$: Width direction restricting member
2: Transport device
21: Transfer machine
212: Locking part
90: Article
901: Front surface portion
902: Rear surface portion
91: First article
92: Second article
C2: Control unit
M: Driver
A1: First placement region
A2: Second placement region
P1: First article proper position
P2: Second article proper position
X: Depth direction
X1: Depth-direction near side
X2: Depth-direction far side
Y: Width direction

The invention claimed is:

1. An article storage facility comprising:
an article storage rack comprising a storage section capable of storing two articles arranged in a depth direction;
a transport device configured to transport the articles in a transport direction intersecting the depth direction; and
a control unit configured to control actuation of the transport device,
wherein;
the transport device comprises a transfer machine configured to execute a take-out operation of moving the articles in the depth direction to take out the articles from the article storage rack,
when a side on which the transport device is located relative to the article storage rack in the depth direction is defined as a depth-direction near side, a side opposite to the depth-direction near side is defined as a depth-direction far side, the article stored on the depth-direction near side of the storage section is defined as a first article, the article stored on the depth-direction far side of the storage section is defined as a second article, and a proper position of the second article in the storage section is defined as a second article proper position,
the transfer machine comprises a locking part configured to be locked to either a front surface portion of each of the articles that faces the depth-direction near side or a rear surface portion of each of the articles that faces the depth-direction far side, and a driver configured to move the locking part,
the control unit is capable of controlling the driver to cause the transfer machine to execute:
a first article take-out operation of disposing the locking part between the first article and the second article in the depth direction, and subsequently moving the locking part to the depth-direction near side with the locking part locked to the rear surface portion of the first article, to execute the take-out operation on the first article; and
a second article position adjustment operation of moving the locking part disposed between the first article and the second article in the depth direction toward the depth-direction far side to a position corresponding to a position of the front surface portion of the second article located at the second article proper position, and
the control unit is configured to, after the locking part has been disposed between the first article and the second article during execution of the first article take-out operation using the transfer machine, cause the transfer machine to execute the second article position adjustment operation, and to complete the first article take-out operation upon completion of the second article position adjustment operation.

2. The article storage facility according to claim 1,
wherein the control unit is configured to, when the control unit causes the transfer machine to execute the second article position adjustment operation during execution of the first article take-out operation using the transfer machine, cause the transfer machine to, after the locking part has been disposed between the first article and the second article, move the locking part toward the depth-direction far side to complete the second article position adjustment operation, without moving the locking part to the depth-direction near side.

3. The article storage facility according to claim 2,
wherein the control unit is configured to, each time the control unit causes the transfer machine to execute the first article take-out operation, cause the transfer machine to execute the second article position adjustment operation during execution of the first article take-out operation.

4. The article storage facility according to claim 2,
wherein, when a proper position of the first article in the storage section is defined as a first article proper position, a surface of the storage section on which the articles are placed is defined as a placement surface, a region of the placement surface in which the first article at the first article proper position is placed is defined as a first placement region, a region of the placement surface in which the second article at the second article proper position is placed is defined as a second placement region, and a direction orthogonal to the depth direction in a plan view is defined as a width direction, and
the storage section comprises width direction restricting members protruding upward from the placement surface on opposite sides in the width direction relative to each of the first placement region and the second placement region.

5. The article storage facility according to claim 1,
wherein the control unit is configured to, each time the control unit causes the transfer machine to execute the first article take-out operation, cause the transfer machine to execute the second article position adjustment operation during execution of the first article take-out operation.

6. The article storage facility according to claim 5,
wherein, when a proper position of the first article in the storage section is defined as a first article proper position, a surface of the storage section on which the articles are placed is defined as a placement surface, a region of the placement surface in which the first article at the first article proper position is placed is defined as a first placement region, a region of the placement surface in which the second article at the second article proper position is placed is defined as a second placement region, and a direction orthogonal to the depth direction in a plan view is defined as a width direction, and
the storage section comprises width direction restricting members protruding upward from the placement surface on opposite sides in the width direction relative to each of the first placement region and the second placement region.

7. The article storage facility according to claim 1,
wherein, when a proper position of the first article in the storage section is defined as a first article proper position, a surface of the storage section on which the articles are placed is defined as a placement surface, a region of the placement surface in which the first article at the first article proper position is placed is defined as a first placement region, a region of the placement surface in which the second article at the second article proper position is placed is defined as a second placement region, and a direction orthogonal to the depth direction in a plan view is defined as a width direction, and
the storage section comprises width direction restricting members protruding upward from the placement surface on opposite sides in the width direction relative to each of the first placement region and the second placement region.

8. The article storage facility according to claim 7, wherein the storage section comprises a depth direction restricting member protruding upward from the placement surface on the depth-direction far side relative to the second placement region.

\* \* \* \* \*

UNITED STATES PATENT AND TRADEMARK OFFICE
CERTIFICATE OF CORRECTION

| | | |
|---|---|---|
| PATENT NO. | : 12,122,600 B2 | Page 1 of 1 |
| APPLICATION NO. | : 17/796390 | |
| DATED | : October 22, 2024 | |
| INVENTOR(S) | : Yuichi Ueda et al. | |

It is certified that error appears in the above-identified patent and that said Letters Patent is hereby corrected as shown below:

In the Claims

Column 25, Line 10, Claim 1, delete "wherein;" and insert -- wherein: --

Signed and Sealed this
Seventh Day of January, 2025

Derrick Brent
*Acting Director of the United States Patent and Trademark Office*